Aug. 4, 1959  R. McKIM BROWNING  2,897,730
APPARATUS FOR MANUFACTURING BAG TUBES
Filed Nov. 7, 1955  7 Sheets-Sheet 2
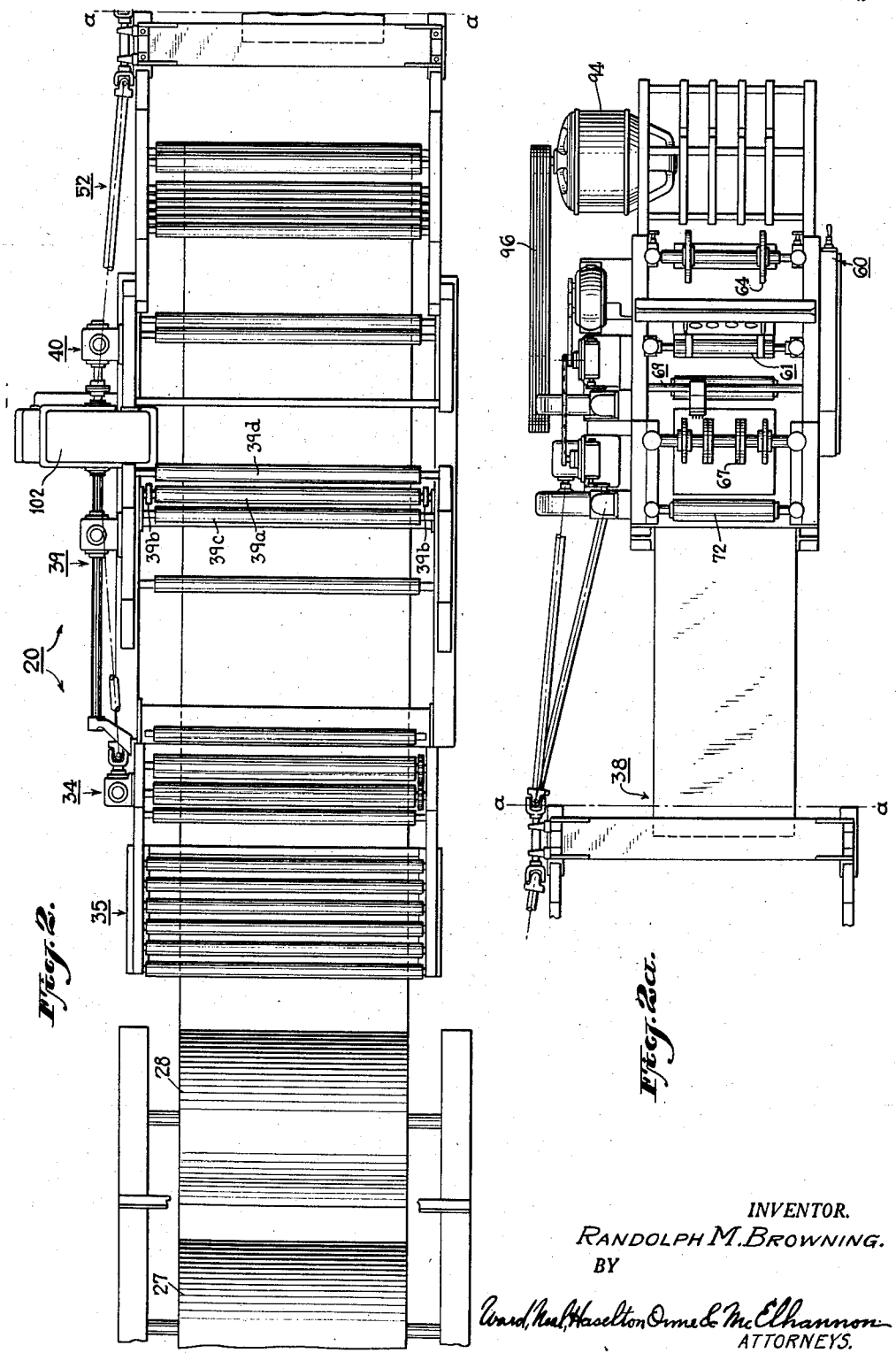
INVENTOR.
RANDOLPH M. BROWNING.
BY
Ward, Neal, Haselton Orme & McElhannon
ATTORNEYS.

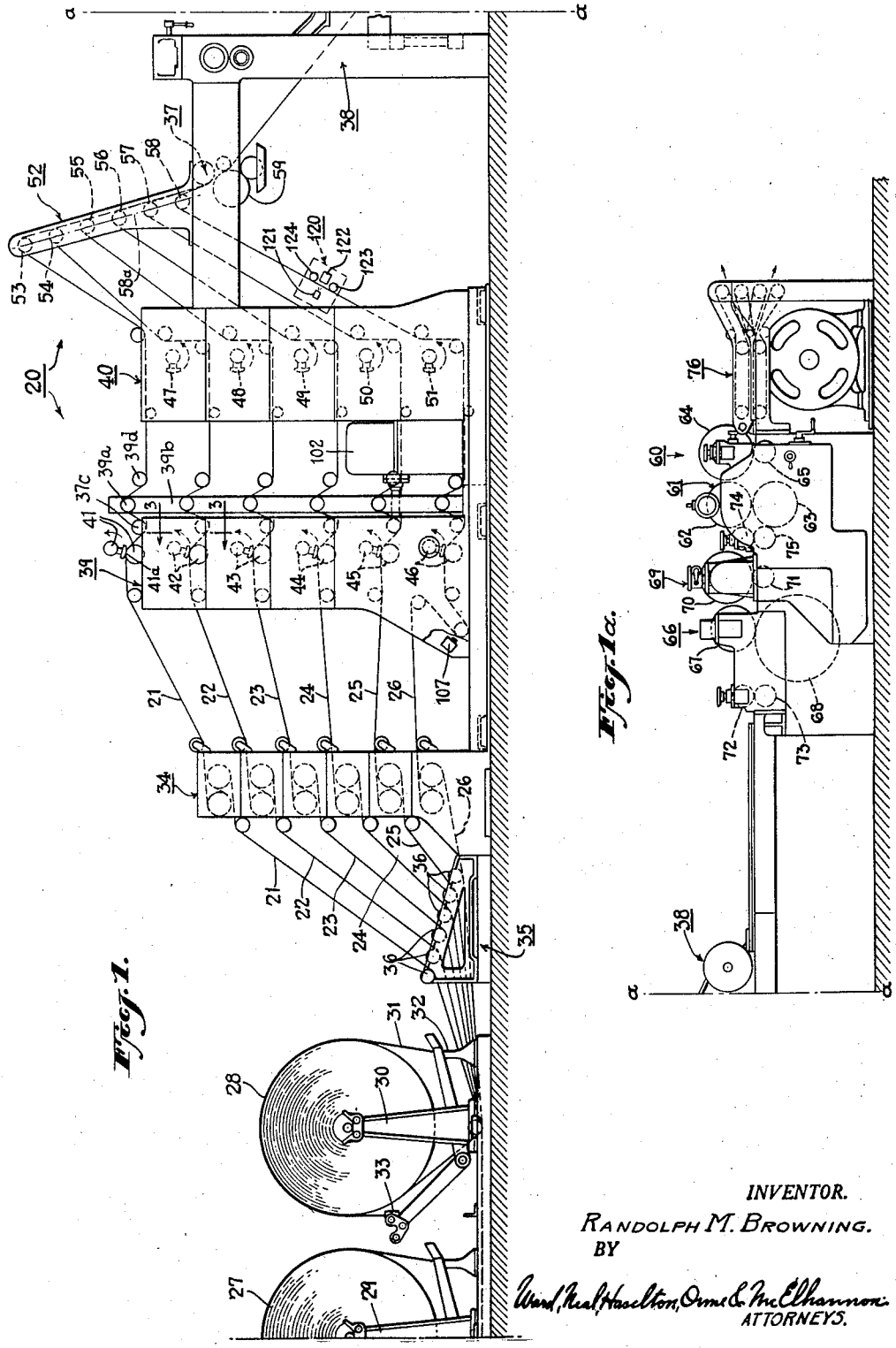

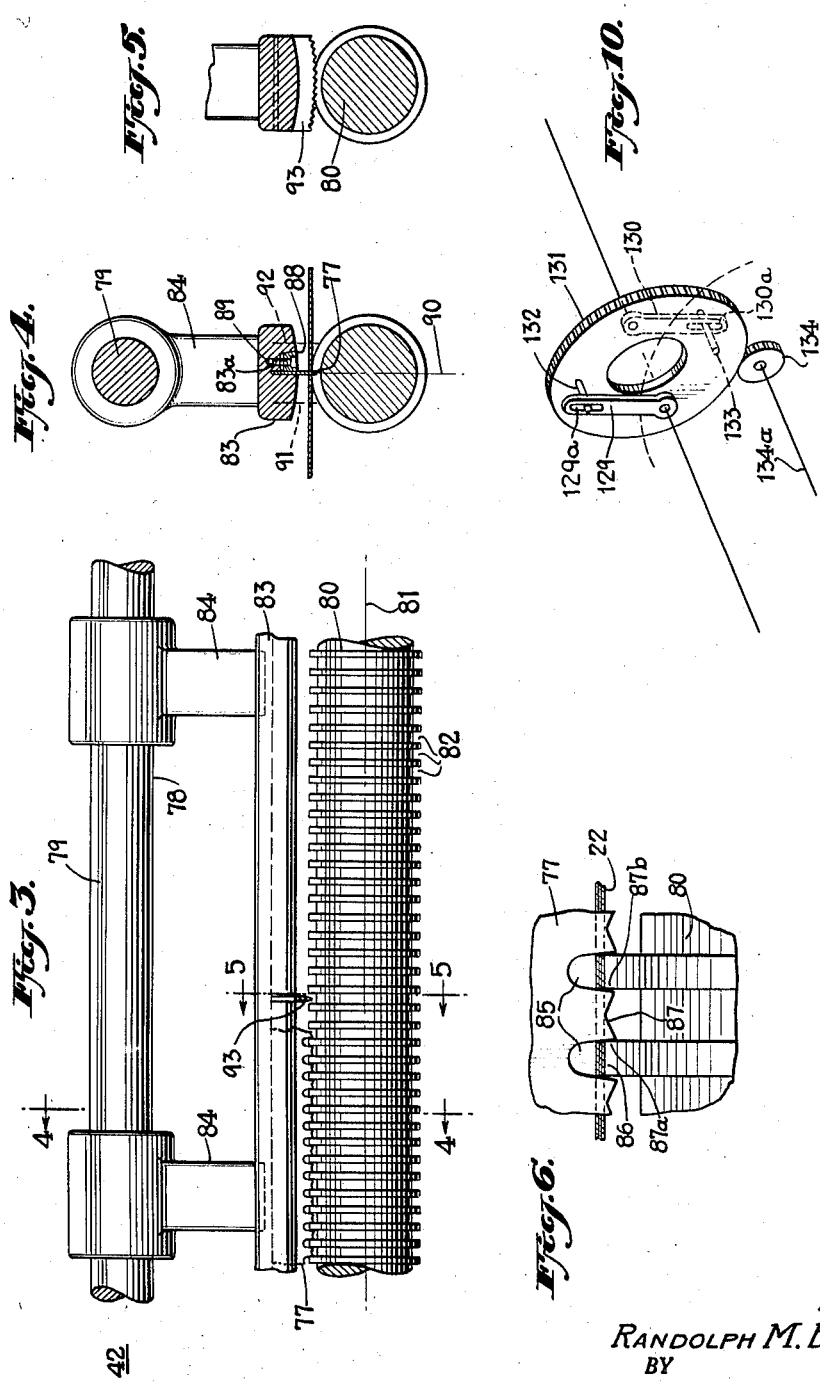

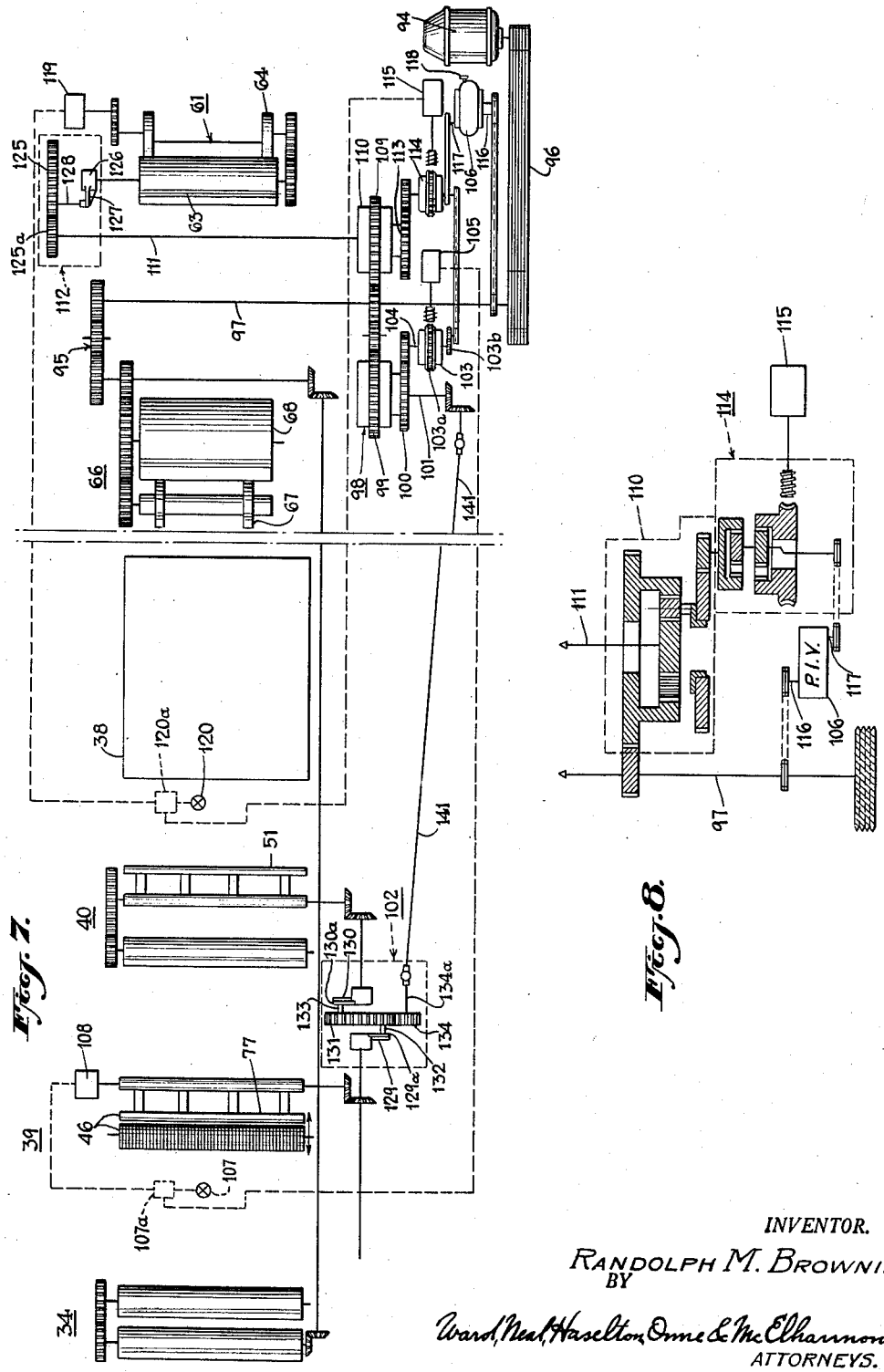

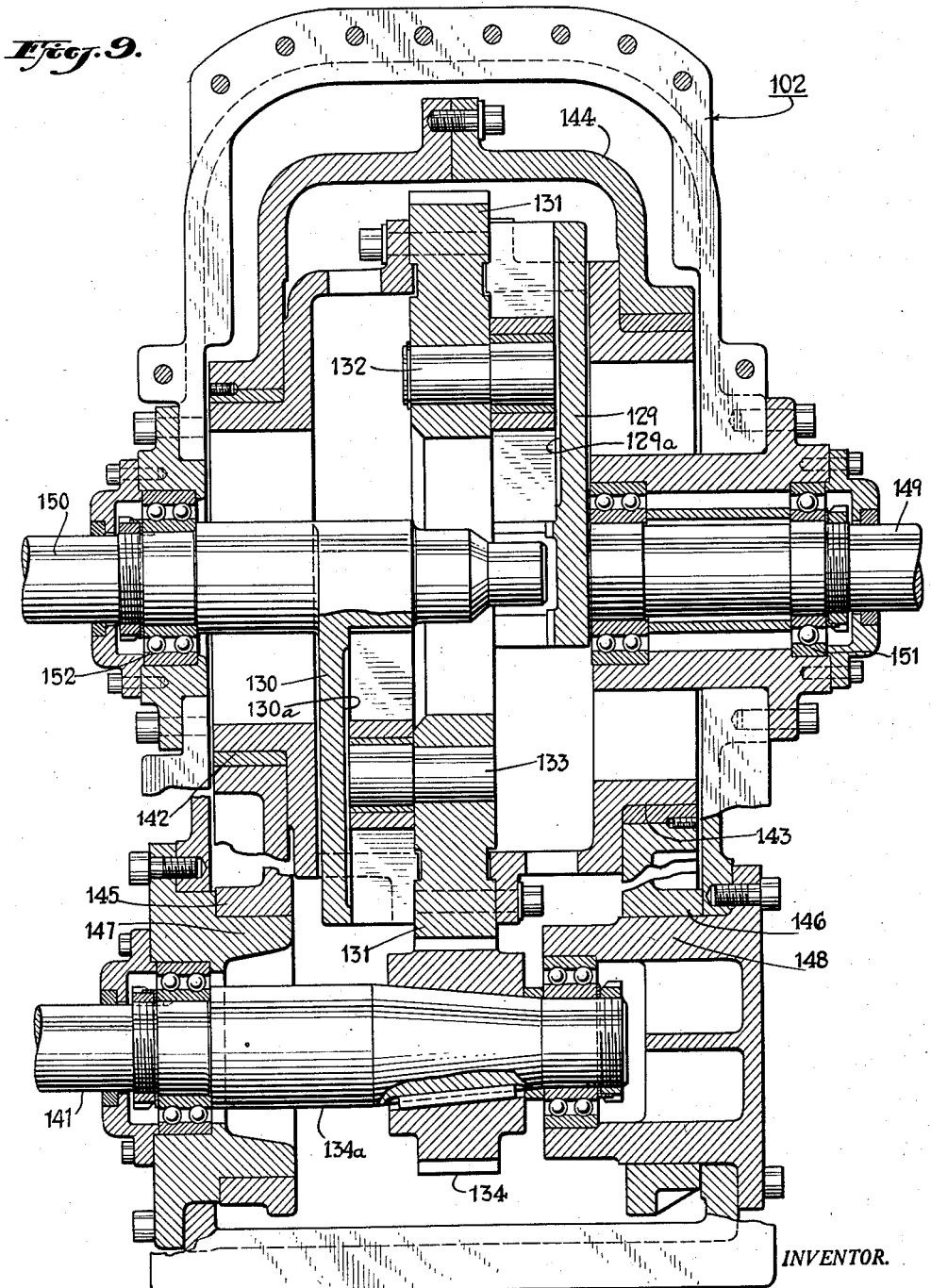

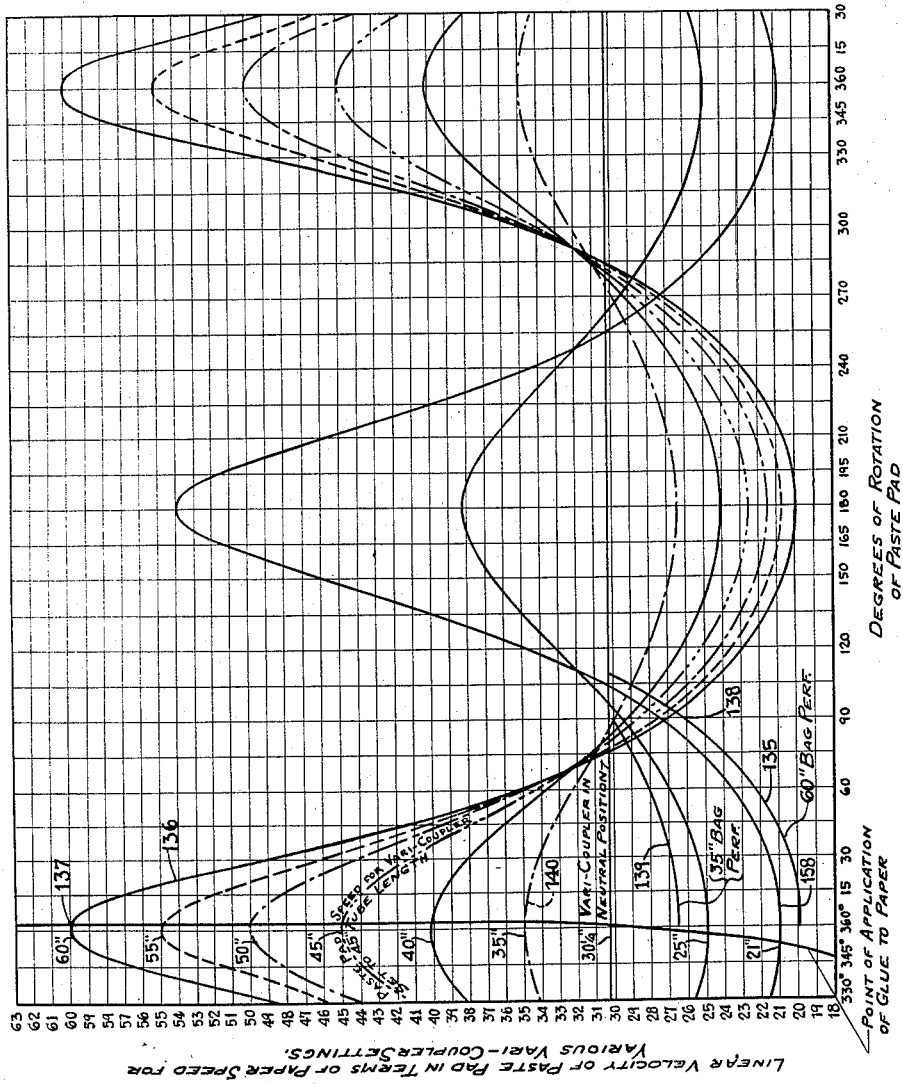

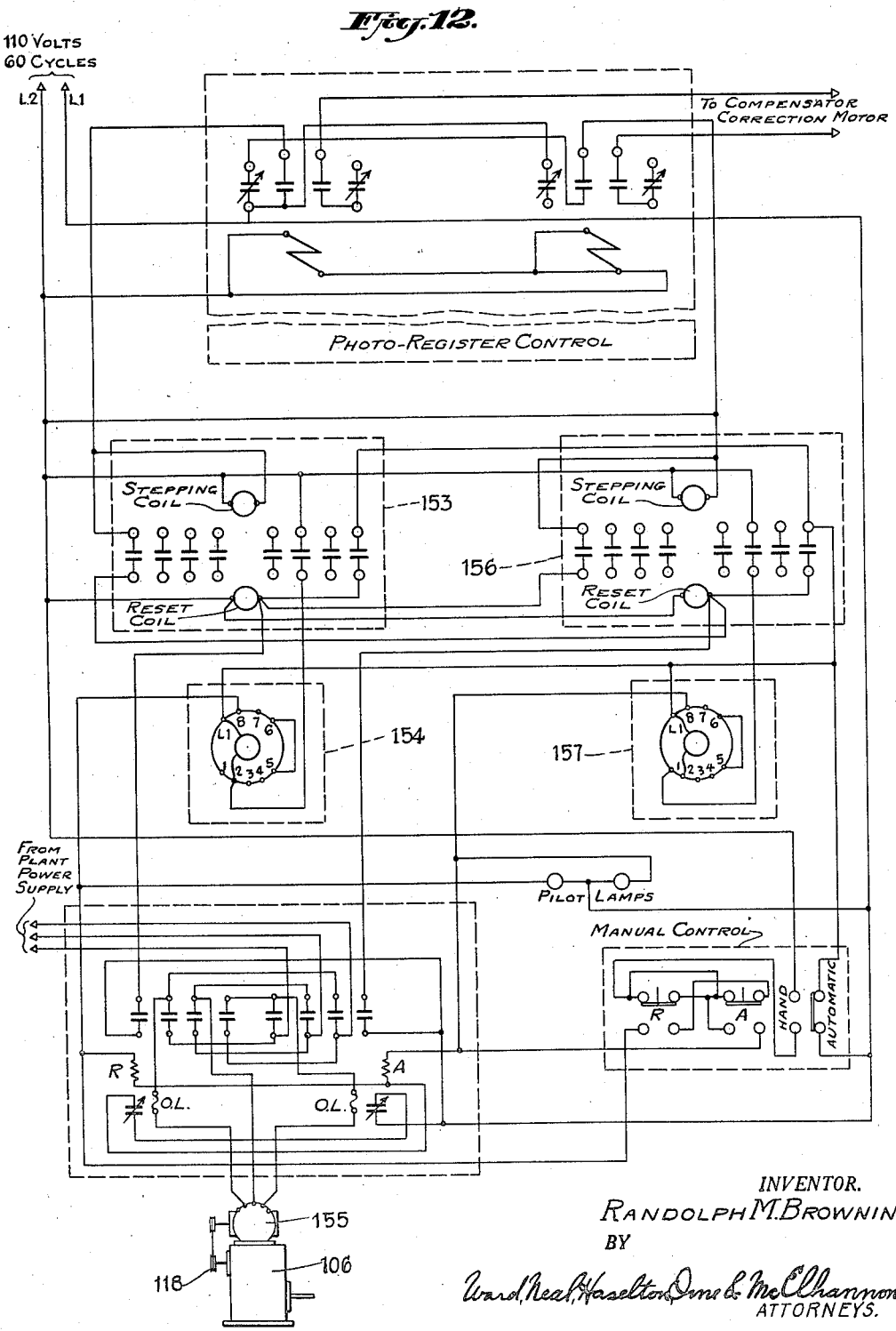

United States Patent Office 2,897,730
Patented Aug. 4, 1959

2,897,730

APPARATUS FOR MANUFACTURING BAG TUBES

Randolph McKim Browning, Pensacola, Fla., assignor to St. Regis Paper Company, New York, N.Y., a corporation of New York Application November 7, 1955, Serial No. 545,363

30 Claims. (Cl. 93—20)

This invention relates to an apparatus which is adapted for the manufacture of a wide variety of different types and lengths of bag tubes. The invention also relates to methods for such manufacture. More particularly the invention relates to control means for such apparatus and to control methods employed in the manufacture of multi-ply bag tubes wherein a plurality of paper webs are assembled in superposed relation and formed into a flattened tube, one of such webs having a series of spaced preprinted impressions thereon, there being one or more repetitive operations upon one or more of the paper webs prior to forming same into a tube and one or more repetitive operations upon the formed paper tube which thus occur after tubing of the webs, such control means and methods automatically maintaining selected phase relationships of such several operations with one another and with the aforementioned preprinted impressions.

The invention also relates to novel apparatus for balancing fully, or at least partially, the torque reaction of one element which acts upon one or more of the webs against the torque reaction of another such element thereby to minimize wear of the apparatus due to torque surges.

In bag tubing apparatus heretofore proposed, particularly where an outer web of a multi-ply web supply has a succession of preprinted impressions thereupon, that is, printed thereon prior to the web being unrolled to the tuber, substantial difficulties have been encountered in bringing into proper phase relationship operations upon one or more of the webs prior to tubing with operations upon the tubed webs after tubing.

Moreover, apparatus of this type heretofore suggested has required extraordinarily long periods for the adjustment thereof to the manufacture of a bag tube of a length different from that for which previously adjusted.

Also in such apparatus suggested in the past of this general type where at least two separate operations, such as cross-pasting and perforating by two separate means, are required upon the webs before tubing, which separate means must operate in extremely precise phase relation and which means are subjected to substantial torque efforts and reactions, such efforts and reactions have resulted in undue wear within short periods of time, thereby producing inaccuracies in the phase relationship of such operations.

Further, with reference to a particular problem in this art to which this invention is applicable, no prior art bag tubing apparatus or method has been successful in producing stepped-end bags with flush cut corners, one of the webs of the multi-ply web supply being preprinted.

One of the objects of the present invention is to overcome the above difficulties or to reduce same to insignificance.

Another object is to provide novel method and apparatus for the automatic phase control of operations on a plurality of webs performed before and after the tubing thereof.

The invention in one aspect thereof is constituted by a phase control or phase correction system (also known as a speed compensator system) for a bag tuber, the principal aim of which is to insure that repetitive operations upon one or more of the several webs prior to tubing are done in proper phase relationship with a succession of preprinted impressions upon one of the webs, and that such last-mentioned repetitive operations are in turn performed in proper phase relationship to repeated operations performed on the tube made from such webs. Thus such phase control system is designed for the purpose of insuring: (a) that a series of impressions preprinted upon at least one of the webs and separated by a substantially constant interval is presented in proper phase relationship to one or more web working elements; and (b) further that the web characteristics, such as web perforations, formed by such web working elements are presented in proper phase relationship to means for acting repeatedly upon the tube such as a tube separating element. Such web working elements includes means for acting repeatedly on one or more of the webs to create a series of characteristics thereupon, such characteristics being separated by a substantially constant interval. Examples of such web working elements include perforator and cross-paster means each of which may consist of a group of separate perforator devices and a group of separate cross-paster devices respectively for acting on selected webs, and which groups are driven by a common power source. Such bag tuber, illustratively, can be adapted for the formation of stepped-end bag tubes either of the flush or stepped corner variety, or it can be adapted for forming integral sleeve extension portions, such as formed by the apparatus of a copending U.S. patent application Serial No. 378,340, now Patent No. 2,818,003, patented December 31, 1957 assigned to the assignee of the present application. The bag tuber is provided with a common power drive for the primary or web working elements which are situated in advance of the tube former, and for the secondary or tube working elements situated for acting upon the formed bag tube including, for example, a tube separator and suitable draw roll means which normally are positioned for drawing the finished tube through the tube former. The aforementioned web having the series of preprinted impressions thereupon normally is provided with a series of suitable preprinted reference marks, each mark situated at a selected distance from its respective impression. In order to insure that such impressions are presented in proper phase relation to one or more selected web working elements means are provided for scanning such reference marks and comparing the phase thereof with the phase of a selected one of such primary or web working elements, for example with the phase of a perforator device. This is referred to as a comparison of the first and second phases. Correction motor means are provided which are operatively connected to such phase comparing means for adjusting the driving power to such web working elements in response to the relation of the aforementioned phases, which motor means becomes active in response to a departure of such phases from a preselected norm phase relation zone. And, in order to insure that the series of web characteristics, such as web perforations, formed in each web by its web working element, is presented in proper phase relation to the repeatedly acting tube working element, the characteristics per se formed in a selected web by one of such web working elements are scanned, as by photoelectric means, at a location in advance of the tube former and the phase thereof is compared by suitable means with the phase of such a tube working element (such as a tube separator). This is referred to as a comparison of the third and fourth phases respectively. To effect this, means are provided which are responsive to the phase of such tube working element, and suitable means also are provided for comparing the phase of the series of such web characteristics with the phase of such tube working element. Second correction motor means are also provided for modifying the driving power to such tube working element in response to the departure of such third and fourth phases from a selected norm phase relationship zone.

The invention in a further aspect thereof includes apparatus similar to that described in the preceding paragraph with the addition of a single variable speed control device, for example, one known in the art as a PIV, which is operatively connected to the drives of both the web and tube working elements thereby to insert, when required, a common drive or torque adjustment which thus constitutes a common speed adjustment in a common direction. Suitable means responsive to a preselected cumulative phase error determined either between the aforementioned first and second phases or between such third and fourth phases is operatively connected to such variable speed control device for actuating same by a predetermined amount to adjust the speed of the several web and tube working elements whenever such cumulative phase error in a common direction occurs.

The invention in still a further aspect thereof includes novel means for balancing, at least partially, the torque reaction of one web working element against the torque reaction of another web working element thereby to minimize wear of the apparatus due to torque surges. Such novel means is referred to herein as a double vari-coupler device (or double arm vari-coupler). A single arm vari-coupler device will be briefly described from which an understanding of the double arm device can be had. The single arm vari-coupler device comprises a primary rotatable elements which is rotatable about a primary axis, a secondary or follower element which is also rotatable about its own but separate axis. These elements are operatively connected by means of a pin mounted in one which engages a slot formed in the other. For example, a pin is rigidly secured to the primary element at a fixed distance from its axis of rotation and this pin engages a radially extending slot formed in the follower element. Such elements are so mounted that their axes of rotation are parallel but are relatively movable and can be brought into coincidence or separated, such axes remaining parallel all the while. When the axes are brought into coincidence, the two elements move together at the same speed throughout each revolution. However, when such axes are separated, and thus move out of coincidence (but are still parallel) the angular speed of one of the elements will vary relative to that of the other, during each revolution, as a function of the distance between the axes. Such secondary or follower element will vary in speed in a somewhat sinusoidal manner with respect to the speed of the primary element. Assuming that such primary element is rotating at a substantially constant angular speed, the secondary element, when relatively eccentric thereto as aforementioned, will vary in speed during each revolution as a function of the radial distance of the aforementioned pin to the center of the follower element. A double arm vari-coupler device is provided for driving two of the aforementioned web working elements, which double arm vari-coupler device is similar to the single arm variety except that two coaxial rotatable follower elements are employed, each driven by its respective pin which in the form shown are mounted upon the primary rotatable element, such pins being separated by 180°. Such double arm vari-coupler device, in the form shown, is provided for driving the web perforator and the cross-paster units, although the invention is not limited to the driving of such particular elements, it being possible to employ same for counterbalancing at least partially the torque efforts and reactions of any two cyclically operable elements. The double arm vari-coupler device is so designated because it in effect has two driving arms, namely, the arm measured perpendicularly from the common axis of such follower elements to the first driving pin and a second arm measured from such common axis to the second driving pin. Each of the two secondary or follower elements are provided with radially extending slots which are engaged by their respective driving pins. The axes of rotation of the two follower or secondary elements are at all times coincident and preferably are fixed, whereas the mounting for the primary rotatable element is so constructed and arranged that its axis of rotation can be moved into or out of coincidence with the common axis of said two follower elements while remaining parallel thereto. Consequently a shifting of the primary or drive element into an eccentric position relative to the common axis of the two follower elements will compel the two web working elements connected thereto to follow sinusoidal-like speed curves which are 180° out of phase with one another. The two web working elements, which are respectively driven by the double arm vari-coupler, are so adjusted that when one such element is acting upon the web, the other of such elements is 180° from its point of action upon the web. Consequently the phase relationship of such two web working elements connected to the double arm vari-coupler remains constant throughout the operation of the machine, namely, 180° out of phase. The effect of torque surges upon the apparatus is thus partially counterbalanced, as will be explained more fully hereinafter.

One group of such web working elements may comprise a group of web perforator devices, and the other group of web working elements a group of cross-paster devices. In the past when adjusting a tuber to produce a new tube length it has been necessary to adjust each individual perforator device with respect to its corresponding cross-paster device, a time-consuming activity. However, in the present apparatus, because of the fact that the phase of each perforator device is fixed at all times with respect to the phase of its respective cross-paster device (or other web working device) throughout the operation of the machine, it is not necessary to make such time-consuming multiple adjustments. In lieu thereof, the two separate groups of web working elements (such as the group of perforator devices and the group of cross-paster devices) are mounted for movement as groups relative to one another whereby the distance between the groups can be varied. For example, one such group of web working elements, such as the group of perforator devices, can be mounted for lineal movement in a horizontal direction relative to the group of cross-paster devices without altering such fixed phase relation therebetween. Thus if it is desired to adjust the machine to manufacture a 45-inch bag instead of a 21-inch bag theretofore formed, it is necessary only to adjust the distance between such separate groups of web working elements. For example, a perforator unit consisting of several web perforator devices may be horizontally or linearly movable as a unit with respect to the cross-paster unit (consisting of several cross-paster devices) thereby to adjust the distance therebetween. Such distance will be half a unit bag length or a multiple thereof. Alternatively, the distance between such groups of web working elements may in effect be adjusted by interposing between them laterally shiftable paper rolls over which the webs are threaded. These rolls may be simultaneously shiftable to change the web distances equally for all webs and thus also avoid time-consuming multiple adjustments.

The versatility and heretofore unattained flexibility of operation of the apparatus due to the ease of adjustment for many different bag lengths is largely attributable to the use of the aforementioned double arm vari-coupler which drives such two groups of web working elements, which groups in turn are so movable relative to one another. In those examples of the invention where it is desired for one or more web working elements to engage and act upon the web at paper speed, that is, at the same speed as the advancing web, it is necessary to provide some adjustment to the speed of operation of such web working element or elements to accommodate each different bag length as will be explained hereinafter.

While such adjustments are necessary, it may be noted that the number of cuts of bag lengths per minute does not and need not vary exactly inversely with the tube length for tube lengths less than the mean circumference of the cutting element. For instance, the cutting of 200 tubes per minute would be considered satisfactory for 21 inch tube lengths on conventional multi-wall bag making equipment while from 300 to 400 would be considered typical performance for tube lengths within the range of from 30 inches to 36 inches, for example. But the basic reason for the requirement of such adjustments of the speed of operation of the paper working elements is due to the fixed circumference of the elements. Since the average length of multi-wall paper shipping sacks is approximately 36 inches, with the machine of the present invention the various elements which act upon the paper are preferably made with circumferences very close to this figure. These elements have to make one revolution for every tube produced and hence have a surface speed equal to the paper speed only for a tube length equal to their circumference. But when the tube length is smaller than the circumference, it is necessary momentarily to slow down the element at its point of action, and conversely when the tube length is longer than the circumference of the element it is necessary to speed up the element momentarily at its point of action. In the case of a tube cutter, the slowing down should occur so that at the point of contact the cutter is moving faster than the tube, for example, up to 10% faster. However, reverting to the double arm vari-coupler and its connection to the two groups of web working elements aforementioned, the double arm vari-coupler comprises novel means for adjusting all of the perforators of its group and all of the cross-pasters of its group to paper speed for any given tube length. The 180° out of phase relationship of the two vari-arms reduces the maximum torque load imposed upon the power drive therefor. The combination of the double arm vari-coupler for such two groups of web working elements with the means for moving one of such groups of elements relative to the other (or other means for making a common adjustment of the lengths of the webs between the two web working elements) reduces to a total of two the adjustments which are required for such web working elements to accommodate a change of tube length.

The invention in still a further aspect thereof is constituted by a combination of features, namely, the combination of means for maintaining for all webs a common distance (or a substantially common distance within a preselected tolerance of about ± one-half bag length) between the point of web perforation (or other web working operation), and the point of assembly of such webs prior to tubing, such means coacting with the phase control or speed compensator system above described whereby a common speed correction determined by reference to one of the webs and one of the web working elements can be applied to all of the web working elements which act upon the web prior to tubing (such as perforators and cross-pasters) with the assurance that it will have a substantially common effect on all of the webs at the aforementioned assembly point. This is true because of the phase comparison and speed control means which compares the phase of the series of preprinted impressions on the web (or of any other series of reference marks upon a given web) with the phase of a web working element. Thus a speed correction for the perforator for a single web, such as the preprinted web, is well adapted for correcting the speed of the other perforators. Consequently, the task of the phase comparison means which governs the speed correction for the tube working element (such as a tube separator) is made much easier because there is presented to such tube separator all of the perforations or other web characteristics in good register (or other phase relation) with one another and in selected relation to a preprinted impression. Such tube working element is then better able to act with accurate phase relation with respect to the several characteristics formed by the web working elements and hence is in proper relation with the preprinted impressions. This is further facilitated by the comparison of the aforementioned third and fourth phases (illustratively the phase of the perforations with the phase of the cutter) by scanning through the web, that is, through a perforation or other weakening line formed in the web and comprising the web characteristic formed by a primary web working element. Thus this comparison of the third and fourth phases is not done directly by referring to the phase of the first web characteristics, such as the preprinted reference marks, but rather is done by scanning the actual weakening line.

Various, further and more specific objects, features and advantages of the invention will more clearly appear from the detailed description given below taken in connection with the accompanying drawings which form a part of this specification and illustrate, by way of example, preferred arrangements of parts for carrying out such invention. The latter consists of such novel combinations of features and method steps as may be shown and described in connection with the equipment herein disclosed.

In the drawings:

Figs. 1 and 1a jointly comprise a view in side elevation, and partly in longitudinal section, of a multi-wall bag tubing machine showing, by way of example, web working elements, such as web perforating and cross-paster units, situated in advance of a tube former and also showing a tube working element, such as a tube cutter, situated after such tube former, such apparatus being in accordance with one form of the present invention, Fig. 1a being a continuation of Fig. 1 as taken along line a—a of Fig. 1;

Fig. 2 is a plan view of that portion of the apparatus shown in Fig. 1;

Fig. 2a is a plan view of the apparatus shown in Fig. 1a;

Fig. 3 is a fragmentary front elevational view on an enlarged scale as compared to Fig. 1 and taken substantially along line 3—3 of Fig. 1;

Fig. 4 is a sectional view taken substantially along line 4—4 of Fig. 3;

Fig. 5 is a sectional view taken substantially along line 5—5 of Fig. 3;

Fig. 6 is a front elevational view of a fragment of Fig. 3 but on a larger scale and thus showing in magnified form the details of several perforator teeth coacting with the grooves of cooperating perforator rolls;

Fig. 7 is a top plan view illustrating schematically certain principal elements of the apparatus shown in Fig. 1 and including a showing schematically of the photo cell phase control system for the web working and tube working elements;

Fig. 8 is a plan view illustrating schematically, partly in section and with parts broken away, a portion of the aforementioned phase control system (or compensator system), particularly a portion for driving a tube cutter element;

Fig. 9 is a vertical sectional view of the aforementioned double arm vari-coupler unit employed for operatively interconnecting two groups of the web working elements, such as the cross-paster unit and perforator unit;

Fig. 10 is a perspective schematic view of such double arm vari-coupler;

Fig. 11 is a graphic representation showing the relative velocities of the two groups of web working elements coupled by the aforementioned double arm vari-coupler unit; and Fig. 12 is a schematic representation of one form of wiring diagram illustrating a portion of the aforementioned phase control system, particularly that portion for selecting and making a constant correction to the phase control system in response to the occurrence of a selected cumulative error in the relationship of two selected phases, such as the phase of a preprinted reference mark with the phase of a perforator.

Referring to the drawings in greater detail with particular reference to Figs. 1, 1a, 2, 2a and 3–8, inclusive, there will now be described one form of the novel phase control system for a bag tuber 20.

The present invention will be described in connection with a stepped-end tuber apparatus which can be adapted for the production of stepped-end bag tubes of either the flush or stepped corner types, such as those shown and described in the following U.S. Patents: 2,122,061, 2,122,062, 2,055,030 and 2,176,499 and in the copending applications of Alexander Gelbcke Serial No. 282,350, filed April 15, 1952 now Patent No. 2,729,150 and Serial No. 394,438, filed November 25, 1953 now Patent No. 2,810,509.

Such tubing machine 20 is shown in Figs. 1 and 1a, the apparatus being set up to manufacture a six-ply bag tube, the various paper plies 21–26, inclusive, of which are fed respectively from a six roll source, only two of which rolls, 27 and 28, are shown. The paper rolls, such as 27 and 28 are mounted upon roll stands, such as 29 and 30, which include conventional facilities for shifting a new roll of paper in place as the paper becomes exhausted from the previous roll. For maintaining appropriate back tension on the paper webs, a belt 31 of canvas or the like, having one end fixedly secured at 32, is looped over each roll and terminates at a weight 33. The webs 21–26 are directed to an auxiliary draw roll unit 34 via a guide roll unit 35 which includes a group of six horizontal guide rolls 36, one for each web.

The auxiliary draw roll unit 34 includes a number of pairs of draw rolls equal to the number of plies or webs of paper, in the form shown six, such rolls all being horizontal and parallel, the pairs of rolls being situated consecutively one above the other in vertical alignment, as shown in Fig. 1.

The webs from the auxiliary draw roll unit 34 are directed to a web assembly point 37 in superposed assembled relation prior to being directed to a tube former 38. Prior to the webs reaching the web assembly point 37, they are directed through two groups of web working elements 39 and 40 which groups, in the form shown, comprise respectively a perforator unit and a cross-paster unit.

The perforator unit 39 is constituted by a plurality of perforator devices or subunits 41–46, inclusive, the details of one of which are well illustrated in Figs. 3–6, on an enlarged scale, which are described more fully hereinafter. Such subunits 41–46 are also superposed, that is, situated one above the other consecutively in vertical alignment. Subunits 41–46 have a common drive and thus are drivably geared together, the same being true of the cross-paster subunits.

The cross-paster unit 40 analogously comprises a plurality of cross-paster subunits 47–51 inclusive, there being however a number of such subunits which is one less than the number of plies, there being no need to apply a crosspaster to the innermost ply. The subunits 47–51 are also superposed in the manner of subunits 41–46.

Coacting with the units 39 and 40 is a web assembly unit 52 sometimes referred to as a pagoda unit, the purpose of which is to collect the several webs in a desired superposed relation and to assemble same at the aforementioned assembly region or point 37. Such web assembly unit, in the form shown, comprises six web assembly rolls 53–58, inclusive, one for each web, which rolls are parallel and horizontal in attitude. The mounting means (not shown) for such rolls are constructed and arranged to permit movement of each in a vertical and/or horizontal direction as desired while still maintaining same in parallel relation with the other rolls, the purpose of such adjustable mounting means being to provide means for fine adjustment of the position of a web characteristic, such as a perforation in any single web, relative to other web characteristics. Also such adjustments, for example, may be used for compelling one web characteristic, such as a web perforation, for an extended intermediate ply to move out of phase with other perforations in the region of such extension thereby to produce a bag tube having an intermediate ply with an extension therein at the valve region, if desired, as in the aforementioned Serial No. 478,340, now Patent No. 2,818,003.

The superposed spaced relationship of the perforator subunits 41–46, the cross-paster subunits 47–51, and the superposed relation and particular relative positions of the web assembly rolls is for the purpose of creating for all of the webs a first common distance as measured longitudinally of the webs between all respective points or lines of perforation and the web assembly point 37, as viewed in Fig. 1, and a different and second common distance as measured longitudinally of the webs between all respective points or lines of cross-pasting and said web assembly point 37. For example, a point of perforation for the perforator subunit 41 is indicated at 41a and the distance along the web 21 from such point to the web assembly point 37 is the same as it is for all of the other webs 22–26, inclusive. Such "common distance" feature of the present invention acting in combination with other features of the apparatus to be set forth hereinafter, aids in achieving a high accuracy of operation of the phase control system.

It is understood that other operations on the web beside perforating and/or cross-pasting can be substituted therefor and that the units 39 and 40 are illustrative only of groups of web working elements which perform operations upon the webs prior to tubing, which operations must be maintained in selected phase relation to the operations of other elements as aforementioned, such as a tube separator or cutter.

The term "web working element" as employed herein embraces only those elements which perform operations upon the web prior to tubing. The term "tube working element" includes only those elements performing operations upon the paper after having been formed into a tube.

Referring again to the web assembly unit 52, the superposed rolls 53–58 are relatively disposed for the purpose of accomplishing the aforementioned "common distance" feature between the point of perforation of each web and the web assembly point 37. The rolls may be individually or jointly adjusted in position as above mentioned for the purpose of individually or jointly adjusting such distance for each web.

The several paper webs, after passing the web assembly point 37, are directed past a glue applicator 59 which is provided for printing glue lines along the downwardly disposed stepped longitudinal edges of the successive paper plies, the webs thereafter being tubed by the tube former 38 in a well known manner and directed to a tube separating unit generally indicated at 60, including a tube cutter element 61 having cutters 62 and 63 and separator rolls 64 and 65. The tube separating unit 60 may, in another form, employ no cutter but instead may employ means for pulling tube lengths off the main tube.

The tube is drawn through the tube former by means of a main draw roll unit 66 consisting of upper and lower draw rolls 67 and 68, respectively. The draw roll unit 66, of course, coacts with auxiliary draw roll unit 34 above described and the draw rolls of such units, in a preferred embodiment of the invention, are driven as will appear more fully hereinafter. Normally the draw roll units 66 and 34 are driven at a substantially constant speed which produce a web or paper speed of the order, illustratively, of 700 to 900 feet per minute.

There may be situated intermediate the bag tube cutter 60 and the draw roll unit 66 a further tube working element, such as a tube perforator or slitter 69 consisting of perforator or slitter elements 70 and 71.

A superposed pair of rubber covered smoothing or forming rolls 72, 73 may be positioned in advance of the draw roll unit 66 and a further pair of roll units 74 and 75 may be positioned intermediate the units 61 and 69 to hold the tubing against the pull-apart action in the tube separating unit.

A bag tube discharge unit 76 is provided for receiving the separated bag tube lengths and discharging same to suitable receiving means.

Referring now to Figs. 3-6, a perforator subunit, such as 42 (Fig. 1), will now be described, it being understood that the other subunits 43-46 are similar. Such perforator subunit consists of: a knife element 77 rotatable about an axis 78 upon a shaft 79, a rotatable grooved roll 80, the latter being rotatable about an axis 81 and having a plurality of consecutively situated and coaxial grooves 82 formed on the outer surface thereof. The grooved roll 80 has the common outer diameter of the ungrooved portions and preferably a common groove bottom diameter of the floor of the grooved portions thereof and need not be power driven but, if desired, can be turned by the action of the web moving thereover.

The rotatable knife 77 is rigidly secured within a knife holder bar 83, the latter being connected by arms 84 to the rotating shaft 79.

The details of the cutting edge of the knife 77 is well shown in Fig. 6 and comprises a serrated blade having recesses, such as 85, for the purpose of accommodating ungrooved portions 86 of the grooved roll 80. Blade 77 is provided with teeth, such as 87, having an inverted V cutting edge, as viewed in Fig. 6, for the purpose of facilitating its penetration of the web 22. Each tooth 87 thus has two leading points 87a and 87b which are situated closely adjacent the side walls of the groove when in the position shown in Fig. 6 and which preliminarily penetrate the web 22.

The length of the knife 77 is, of course, determined by the type of bag tube or bag bottom which is to be made by the machine. Such knife 77 may be disposed, along with all of the other knives of the apparatus, to produce transverse perforations in the webs in the manner shown in the aforementioned copending patent application Serial No. 378,340, now Patent No. 2,818,003, or such knives may be of such a conformation and relative disposition to produce perforations for the bags shown in the aforementioned patents, or for other desired purposes.

Referring to Fig. 4, the knife 77 can be rigidly secured in the knife holder bar 83 by any suitable means, for example, by means of a wedge 88 which is held in position by a series of screws, such as 89.

The knife holder bar 83, in the form shown in Fig. 4, is provided with a substantially centered longitudinal groove 83a for receiving the knife 77 and the wedge 88. Such groove positions the knife 77 in the radially extending plane illustrated in cross-section by the radial line 90.

Alternatively, such groove 83a may be situated off center either to the right or left of the position shown in Fig. 4, whereby the knife 77 may be situated either in the position shown by dotted lines 91 or 92.

The purpose of so altering the position of the knife 77 is to alter the position of the perforation formed thereby with respect to the other perforations formed by the other perforator subunits.

Illustratively, in the manufacture of bag tubes for stepped-end bags, the knife 77 of those perforator subunits which act on the inner and outer plies should be situated along the lines 91 and 92 whereas such knives 77 which act upon the intermediate plies may be positioned as shown in solid lines in Fig. 4, i.e. in plane 90.

In the manufacture of a bag tube having an intermediate ply with an extended portion at the valve region, as disclosed in said copending patent application Serial No. 378,340, Patent No. 2,818,003, all of the transverse partial perforations at the valve region can be made with the several perforator knives, such as 77, in the central position shown in Fig. 4, and a pertinent web assembly roll, of the group 53-58, can be shifted to insure a desired phase departure of a selected one of such perforations. Or alternatively, one of the knives 77 upon a selected perforator subunit can be shifted to the position of line 92 (Fig. 4). Or as a further alternative a notch cutter may be employed as shown in Fig. 10 of said application Serial No. 378,340.

Slitting of the webs can be accomplished by suitably positioned slitter knives, one of which is shown at 93 (Figs. 3 and 5) which coact with the grooved roll 80, as shown.

Referring now to Figs. 7 and 8, there will be described in further detail the phase control or speed compensator system which is designed for the purpose of automatically maintaining a selected phase relationship between the operations performed on the paper prior to tubing and the operations performed on the paper after tubing, particularly where one of the webs, such as the outer one, has a series of preprinted impressions thereupon, it being understood that the term "preprinted web" as referred to herein refers to a web having a series of substantially equally spaced impressions printed thereon prior to the unrolling of the source roll of such web.

Main power drive means are provided comprising an electric motor 94 which is operatively connected to the draw rolls of the auxiliary draw roll unit 34 and to such rolls of the main draw roll unit 66 for operation at a fixed speed ratio. That is, with the exception of suitable change gears 95 interposed in such operative interconnection for the purpose of changing the r.p.m. of such rolls to adjust for the manufacture of bag tubes of differing lengths, there are employed no means for varying the speed relationship between such rolls and the motor 94. The latter is operated at a substantially constant speed to achieve the aforementioned web or paper speed of about 700 to 900 feet per minute. During the manufacture of tubes of a selected length, such web or paper speed normally will not be changed by any appreciable degree and hence the draw rolls at units 34 and 66, in the form shown in Fig. 7, are normally driven at a substantially constant number of revolutions per minute.

Accordingly, the motor 94, by means of a belt 96 passing over suitable pulleys, drives a main drive shaft 97 which, through the intermediary of said change gears 95, is connected to and drives the draw rolls 67, 68 of the draw roll unit 66.

The driving torque for the primary web working elements of units 39 and 40, illustratively the perforator and cross-paster units, is communicated thereto from the motor 94 through the intermediary of a first main differential 98 having two input gears 99 and 100 and an output shaft 101. The latter is operatively connected to a double arm varicoupler unit 102 above mentioned. The torque from the motor 94 comprises one of the inputs to the first main differential 98 via the input gear 99. Correction torques are interposed in such operative interconnection between the motor 94 and such web working elements through the intermediary of a first auxiliary differential 103 having an output 104 which is connected to the input gear 100 of the differential 98.

The function of the first auxiliary differential 103 is to add algebraically two different correction torques, namely:

(a) A correction torque which is responsive to the phase of a web characteristic as compared to the phase of a web working element; and (b) A correction torque responsive to a selected cumulative phase error of a web characteristic which occurs in one direction and which correction torque is designed to minimize hunting of the phase correction system, particularly where a preprinted web is employed and the phase relation of its impressions with respect to one of the web working elements is to be controlled. Consequently, a correction motor 105 for (a) is provided, and also a variable speed control device 106 for (b) which may be of the type known as a PIV.

The correction motor 105 is operatively connected to one input 103a of the auxiliary differential 103 and the PIV 106 is connected to the other input 103b thereof.

The correction motor 105, as aforementioned, is responsive to the relationship between the phase of a reference mark of at least one of the webs with the phase of one of the web working elements, such as the perforator subunit 46 of the unit 39. Consider the example where a preprinted outer web 26 is employed and it is necessary for transverse perforations to be formed in a preselected phase relationship with the preprinted impressions thereon. Suitable means are provided which are sensitive to such phase relationship comprising a photoelectric cell scanning head 107 which is positioned for scanning such reference marks. Each mark is positioned at a common position relative to its respective impression. Thus the preprinted web has a series of reference marks spaced at a constant interval. The phase of such reference marks is determined with respect to the phase of the pertinent web working element, namely, subunit 46. When such phases depart from a selected phase relation (within selected error limits), the aforementioned correction motor 105 is actuated either to retard or advance the perforator thereby to return the latter to the desired phase relation or at least within a selected phase relation zone. In fact all perforator subunits of unit 39 are so retarded or advanced due to the common drive for all as in Fig. 7.

Accordingly, a selector switch 108 is provided which is operatively connected to the pertinent subunit 46 of the perforator unit 39 and thus is responsive to the phase thereof. Switch 108 is electrically operatively connected to the photo cell scanning head 107 by suitable well known electrical means 107a whereby the phase of such perforator subunit 46 is compared to the phase of such reference marks as the latter pass a norm position, for example, beneath the photo cell scanning head 107. So long as the phase of such reference marks is within a preselected phase relation zone with respect to the phase of the perforator 46, the correction motor 105 is unaffected. The latter is an intermittently operated reversible motor and the direction in which it operates, to either retard or advance the web working element, is determined by the action of the phase comparing means 107, 107a, 108. Such phase comparing means may determine if one of the phases is "on," "slow" or "fast" relative to the other and can influence the motor 105 to make a suitable correction.

Thus a first phase comprising that of a web reference mark or characteristic is compared with a second phase comprising that of a web working element. So long as such phases are within a preselected departure range with respect to one another, no adjustment is made to the driving torque of the web working element 46. However, should such first and second phases depart beyond a tolerated error zone, both a directional and a quantitative impulse is directed to the correction motor 105 for the purpose of either advancing or retarding the speed of the group of web working elements, such as those of perforator unit 39.

Such correction introduced by the motor 105 is applicable not only to the individual perforator subunit 46 but to the other perforator subunits 41–45 of unit 39, and also to all of the cross-paster subunits 47–51 of the unit 40, particularly since units 39, 40 are interconnected by the double arm vari-coupler 102, as will be explained more fully hereinafter. Consequently, a phase correction for the perforators will equally affect the phase of the cross-pasters and due to their proximity will be satisfactory therefor.

Before describing the second phase comparing means which is adapted for influencing another element, such as a tube cutter 61, there will be described the means for driving such other element.

The main drive motor 94 communicates its torque to the cutter unit 61 by means of said main drive shaft 97 which drives one input 109 of a second main differential 110, an output 111 of which drives cutter subelements 63 and 64 of cutter 61 via a single arm vari-coupler 112 to be described more fully hereinafter.

Such second main differential 110 has a further input gear 113 which is fed in a manner analogous to the input 100 of the first main differential 98 in that the differential input 113 is fed by a second auxiliary differential 114 which algebraically adds the outputs of a second speed correction motor 115 (analogous to motor 105) with the output of the aforementioned (PIV) variable speed control device 106. The latter feeds a common correction to both of the auxiliary differentials 103 and 114, and is in turn driven by means of the main drive motor 94 by a suitable interconnection with the main drive shaft 97.

Such variable speed control drive 106 thus is operatively connected by means of an input shaft 116 to the motor 94 and by means of an output shaft 117 to both of the aforementioned auxiliary differentials 103 and 114. The speed of the output of the PIV 106 can be varied by means of an adjustment handwheel 118 which if desired can be automatically controlled by means to be later described in connection with Fig. 12.

One of the principal functions of the PIV 106, as aforementioned, is to introduce a common speed correction to all of the web and tube working elements in response to the occurrence of a selected cumulative phase error in one direction, as will appear below.

One of the principal novel features of the present phase control system is constituted by the particular manner in which the correction motor 115 is controlled. Such motor is sensitive to the relationship of the aforementioned third and fourth phases and thus is operated in a novel manner. That is, the motor 115 is operated in response to a comparison of the phase of a web characteristic which is formed in the web by one of the web working elements, such as the perforator subunit 46, with the phase of a tube working element, such as the tube cutter 61. Thus, the aforementioned third and fourth phases respectively refer to the phase of the perforations in a web (or other web characteristic formed by a web working element) and the phase of a tube working element, such as the tube cutter 61.

The means for comparing the third and fourth phases are analogous to those for comparing the first and second phases in that a selector switch 119 is employed responsive to the phase of the tube working element 61, and a second photo cell scanning head 120 is employed which is responsive to the phase of a series of the perforations in a web such as 26, that is, to the phase of a characteristic of a web formed by a prior web working element. These phases are compared by means 120a. We have found it advantageous to scan through the perforations in the selected web in such cases where the prior web working element is a perforator. The photo cell scanning head 120 is shown in more detail in Fig. 1 and includes a light source 121 on one side of the web which directs light energy upon the web and towards a photo cell or other suitable light sensitive device 122 on the opposite side of the web. Such third phase, that is, the phase of the web characteristic thus is sensed at a position in advance of the web assembly point 37, this being a necessity where it is desired to scan through a perforation in a web inasmuch as such scanning through the web would not be possible after tubing.

There are substantial advantages gained by so locating the second scanning head 120 and in scanning through the perforations in that, because the scanning head 120 disregards the first-mentioned reference marks formed on the web once for each preprinted impression, it is possible to locate such reference marks on the margin of the paper web where it later is covered up by the bag tube seam. Consequently, such series of reference marks (for the first scanning head 107) can be located out of the path of other printing which improves the operation of such scanning head 107 and also because of the elimination of the effect of web flutter. The scanning head 120 is placed adjacent a pair of idler rolls 123 and 124 (Fig. 1) over which the web 26 passes under tension thereby eliminating the effect of flutter and thus making the operation of the scanning head 120 more positive. Also the location of the second scanning head 120 in the place shown in Fig. 1, removes same substantially from the vibrations normally occurring in the neighborhood of the tube separator 61.

In the choice of a norm series with respect to which the series of tube cuts is positioned, it is better to use the series of web perforations themselves than to use a series of printed reference marks.

The scanning head 120 and the selector switch 119 are operatively interconnected for the purpose of comparing the third and fourth phases, as aforementioned by means 120a, which in turn influences the second correction motor 115 either to retard or to advance the speed of the tube working element, namely, the tube cutter 61. For example, the phase comparing means may tolerate either a positive or negative phase departure within preselected limits and upon such phase departure exceeding the tolerance, the correction motor 115 is influenced to modify the driving torque to the cutter 61 for the purpose of perfecting the alignment of the tube cut with the perforations as sensed by the scanning head 120.

Referring again to Fig. 7, the aforementioned vari-coupler device 112 will now be described, which device is interposed in the operative interconnection between the second main differential 110 and the cutter unit 61. Such vari-coupler device 112 is of the single arm variety and includes a primary rotatable element or gear 125 which is rotatable about a primary axis, a secondary or follower element 126 (vari-arm) which is also rotatable about its own but separate axis, such axes, however, being movable into and out of coincidence. These elements are operatively connected by means designated as "differential crank means," "variable arm crank means" or "vari-arm crank means," one form of which comprises a radially extending slot 127 formed in the vari-arm 126 which is engaged by a driving pin 128 rigidly secured to the primary rotatable element or gear 125 at a fixed distance from the axis of rotation of the latter. When the gear 125 is coaxial with the rotatable vari-arm 126, the two elements will move during each revolution without relative speed change. The primary rotatable element 125 normally is driven at a constant speed (subject to speed corrections such as those above described) and is mounted in such a way that it can move, in response to manual adjustment, within selected angular limits about the axis of a subordinate drive gear 125a on shaft 111 (Fig. 7) in such a way that gear 125 can be moved a selected angular amount on either side of such coaxial relation with the vari-arm 126. A movement of such gear 125 out of such coaxiality with the vari-arm 126 will cause the linear speed of the latter to vary in a substantially sinusoidal manner, assuming that the gear 125 is driven at substantially constant speed. Such "differential crank means" or "vari-arm crank means" is thus constructed and arranged to maintain driving connection between said primary and secondary elements when concentric or not concentric.

In the cutting off or separating of the tube into bag lengths, it is desirable that the tube cutter or tube separator, at the time of cutting or separating, travel at a speed greater than the tube speed. Also it is important that the tube cutter, with reasonable ease and rapidity, can be adjusted to accommodate a wide variety of lengths of bag tubes. The vari-coupler 112 satisfies these requirements because, by controlling the degree of departure of the axis of drive gear 125 with respect to the axis of the vari-arm 126, it is possible to provide a suitable speed differential between the cutter (or separator) and the paper for a wide variety of bag tube lengths, such speed differential occurring at the time of action, for example, the time of the cutting of the paper. When it is desired to produce bags of short lengths, the tube cutter is moved at a higher r.p.m. than when producing bags of greater length. Thus when forming bags of such greater length, the tube cutter is caused to rotate relatively more slowly (at lower r.p.m.) and, at the point of contact, the tube cutter is increased in speed by the vari-coupler so that it may be, for example, about 10% higher than paper speed.

A suitable hand adjustment device (not shown) is provided which is easily moved so to adjust the relative positions of the axes of gear 125 and arm 126.

The double arm vari-coupler 102 will now be described, which, in the form shown, is employed in the power lines for the perforator and cross-paster units 39 and 40 for jointly driving same. It is understood that the driving torque for all of the subunits of such units 39 and 40 is transmitted through the double arm vari-coupler 102.

Such double arm type vari-coupler is provided for two principal purposes, namely, (a) for minimizing the effect of wear upon the drive to the vari-coupler which otherwise might occur, viz., wear in the first main compensator differential 98 and the various components of the drive between it and the double vari-coupler; and (b) the provision of a single adjustment means whereby all of the perforator and cross-paster subunits can be caused to move at paper speed at their respective web action points, such adjustment means being adjustable to achieve this purpose for the making of bag tubes of a wide variety of lengths.

The manner in which these purposes are accomplished will appear from the description set forth below.

The perforator and cross-paster subunits should be moving exactly at paper speed at the instant when each engages the web although it is conceivable that other types of web working elements at different speed relationship may be required.

In order for the bag tuber apparatus to be quickly adjustable from the manufacture of bag tubes of one length to any one of a variety of other lengths without the need for substantial down time for adjustment, it is desirable, as above explained, to be able quickly and accurately to adjust all of the web working elements, such as all of the perforator and cross-paster subunits, whereby all such subunits will move at an appropriate speed at their respective web action points regardless of the length of the bag tube being manufactured.

The purposes above set forth are accomplished by the use of the double arm vari-coupler 102 above mentioned which is identical to the single arm vari-coupler 112 with the exception that two secondary or follower elements 129 and 130 (vari-armed) are operatively associated 180° out of phase with one another by means of a common primary rotatable element or main driving gear 131. The operative interconnections between said primary rotatable element 125 and said secondary or follower elements 129, 130 are also referred to by the expressions mentioned above regarding vari-coupler 112. The vari-arms 129 and 130 are respectively connected to the perforator and cross-paster units 39 and 40. Such vari-arms 129 and 130, as aforementioned, are also referred to as secondary or follower elements and are rotatable about a common axis. Each is provided with a radially extending slot 129a and 130a, respectively, which slots in turn are respectively engaged by driving pins 132 and 133 situated 180° apart with respect to the axis of rotation of the primary rotatable element or gear 131.

The latter gear is mounted for angular movement within selected angular limits about the axis of rotation of a subordinate drive gear 134 whereby it can be moved into coaxial relation with the coaxial vari-arms 129 and 130 or can be positioned on either side of such coaxial location, such adjustment of the gear 131 being accomplished by means of a handwheel and suitable related structure (not shown).

In order at least partially to minimize the effect of torque surges in the apparatus, the aforementioned 180° out-of-phase interconnection is made. Thus when the perforating knives 77 of the subunits 41–46 (Fig. 1) are in their web cutting positions as there shown, the cross-paster subunits 47–51 are 180° from their web engaging position. This is shown in Fig. 7 for perforator 46 and cross-paster 51.

The phase relationship of all of the perforator subunits is thus fixed with respect to the respective cross-paster subunits, and they move in a fixed phase relationship at all times. That is, once all of the perforator subunits 41–46 are angularly adjusted for acting on the web, they are not thereafter changed unless for the purpose of manufacturing another type (as opposed to another length) of bag. Similarly the cross-paster subunits 47–51 are angularly adjusted with reference to their respective perforator subunits and are not thereafter changed. By virtue of the fixed phase relationship (180° out of phase) between corresponding of said subunits which is brought about by the need to balance, at least partially, the torque reactions of one unit 39 against the torque reactions of the other unit 40, it is no longer necessary or possible to adjust the subunits of one unit with respect to the subunits of another in order to prepare for the manufacture of a bag of a different size (length). In lieu thereof the distance between said units 39, 40 is adjusted, as aforementioned, by increments which are equal to multiples of one-half a bag length or alternatively, suitable means are employed for effecting a common adjustment of the lengths of all the webs between such units.

In the form shown, the distance between the two units 39 and 40 is adjusted by horizontally shifting the perforator unit 39 with respect to the cross-paster 40 which is stationary. It is, of course, possible to control the distance between such units by any suitable relative movement.

Thus, if it is desired to manufacture a bag of 60 inch length, the minimum distance between the point of action of a perforator subunit and the point of action of a corresponding cross-paster subunit is 30 inches although, as a practical matter, such spacing will more likely be 90 inches or 1½ bag lengths.

Thus by making only two adjustments upon these two units 39, 40, namely, by adjusting the lineal distance between their respective points of action (as measured on the web) and also by adjusting the double arm vari-coupler, it is possible to prepare the apparatus for the manufacture of a bag tube of a different length from the one theretofore made.

Instead of adjusting the distance between the units 39 and 40 in the manner mentioned above, alternative means for effecting a common adjustment of the lengths of all of the webs between such units may be employed as shown in Fig. 1 comprising a plurality of rolls (one for each web), one of which is indicated at 39a, and which are simultaneously adjustable in a vertical direction, the respective webs being threaded around such rolls in such a manner that this vertical adjustment changes the web lengths of each web between the two units 39 and 40. The rolls, such as 39a, in the form shown are mounted upon a vertically adjustable frame member 39b which is operatively connected to suitable power means (not shown) for effecting movement of the frame in a vertical direction to a precise and accurate degree, such power means being under the control of the operator of the machine at a suitable control station.

Any suitable guide means (not shown) for the frame 39b may be employed for insuring its adjustable movement in a vertical direction.

Each of the vertically movable rolls, such as 39a, in the form shown in Fig. 1 cooperates with rotatable but axially stationary rolls 39c and 39d, each respective web for each such roll 39a being threaded around the rolls 39a, 39c and 39d in the manner shown in the drawings.

It is understood that all of the rolls aforementioned are maintained parallel to one another and in a horizontal attitude or substantially so.

Referring to Fig. 11, there is graphically shown the relationship between the linear velocity of the pad or applicator of a cross-paster in terms of paper speed for the several vari-coupler tube length settings. When the main vari-coupler drive gear 131 is coaxial with the two vari-arms 129, 130, there is no change in linear velocity of such pad during any single rotation of the gear 131. However, when making the longest tube length, illustratively, 60 inches, the paper speed may be maintained the same as before but the perforator and cross-paster are slowed down in r.p.m. (by a selected degree of eccentricity of drive gear 131 relative to arms 129 and 130) to permit more paper to pass relative thereto but the cross-paster pad sharply increases in speed as it approaches its point of action or paper engagement and engages the web travelling at the same speed therewith thereby avoiding smearing of the adhesive. The slopes of the curve showing cross-paster pads linear speed, for example, for the 60 inch tube length, are indicative of the acceleration thereof and thus symbolic of the forces exerted.

In order to illustrate the counterbalancing or at least partial counterbalancing of the torque surges which occur in the perforator and cross-paster unit, there is shown upon the graph of Fig. 11 a line 135 indicating a quarter phase of the linear velocity of a corresponding perforator subunit which moves 180° out of phase with such cross-paster pad, such line 135 representing perforator speed in forming a 60 inch tube length. The relationship of this quarter phase with respect to a corresponding quarter phase 136 (between points 137 and 138) for the cross-paster for a 60 inch bag tube, illustrates the partial counterbalancing of the surge forces which are symbolized by the slopes of these speed curves.

A further partial counterbalancing relationship is indicated by a second speed line 139 representing perforator speed in forming a 35 inch tube length which is substantially equally counterbalanced by the speed line 140 for the corresponding paste pad.

Reverting to Fig. 9, certain additional details of the vari-coupler 102 will now be described. A drive shaft 141 (in turn driven by output 101, Fig. 7) drives small gear 134 which in turn engages the main drive gear 131 above described. It is about the axis of the gear 134 that the main drive gear 131 can be shifted angularly by suitable mounting means therefor. The main driving gear 131 is mounted for rotational movement upon bearings 142 and 143, which bearings comprise portions of an angularly shiftable main gear supporting housing 144 having collars 145 and 146 for embracing bearings 147 and 148, respectively, concentric with the shaft 134a of gear 134. Thus angular movement of the housing 144 about the axis of the shaft 134a will cause a corresponding angular movement of the main drive gear 131 and will shift same with respect to the common axis of rotation of the vari-arms 129 and 130 which in turn are respectively mounted for rotation upon the shafts 149 and 150. Such two shafts are in turn mounted for rotation in stationary bearings, such as 151 and 152. The angular position of the housing 144 can be adjusted by any suitable means, as by a worm and handwheel (not shown).

Referring now to Figs. 7 and 12, the means for effecting automatically a common correction to the phase control system will now be described.

The aforementioned PIV 106 can be adjusted by its handwheel 118 to superimpose a common speed adjustment upon each of the pair of differentials 98, 103 and 110, 114 thereby to superimpose a common correction upon all of the web and tube working elements connected thereto.

For example, the scanning head 107 and related means 107a, 108 may produce a plurality of impulses to retard the correction motor 105 by virtue of the fact that the perforator knife 77 is rotating too fast. A stepping switch 153 (Fig. 12) is operatively connected to the phase comparing means 107a to sense the accumulated "retard" impulses and in response to the occurrence of a selected number thereof the stepping switch 153 actuates a timer 154 which operates for a preset number of seconds, for example, from zero to 30 and during such time is effective to energize a control motor 155 in a selected direction to adjust the wheel 118 of the PIV 106 in order to compensate for the accumulated error. Conversely, a stepping switch 156 is operatively connected to the means 107a for sensing consecutive "advance" impulses and analogously actuating a timer 157 which, through suitable operative interconnection is adapted for actuating the control motor 155 in an opposite direction during a preselected time set upon the timer 157. At the expiration of such selected time interval set upon either the timer 154 or 157, the PIV control motor 155 will cease operation. It may be noted that each such stepping switch 153 or 156 adds only those impulses to the correction motor 105 which are consecutive in one direction. Should a reverse impulse occur during a series of impulses in one direction, this will bring about a resetting to zero of one stepping switch and the starting of a new count on the other stepping switch.

An important advantage with the above-described automatic PIV control lies in the fact that it fulfills the requirement for very close registration between the perforating and cutting, and in order to maintain such close registration it is important that the PIV be frequently adjusted to its optimum setting. The operator is not always able to give continual attention to the making of such adjustments and even if he attempted to do so, he would not likely be able to make such desirable accurate adjustments as may be effected by the automatic PIV control above disclosed.

The PIV can be automatically adjusted, as aforedescribed, in response to such a selected cumulative phase error occurring between the first-mentioned pair of compared phases (that of the series of indicia and a web working element) or, if desired, in response to a selected cumulative phase error occurring between the second-mentioned pair of compared phases (that of the series of web characteristics and a tube working element).

Suitable stepping switch reset means of a conventional type are associated with said switches 153, 156.

Referring again to Figs. 1, 7 and 11, the advantages of the novel means for interconnecting the two web working elements by the double arm vari-coupler 102 will be explained further. In a bag tuber apparatus, the several web working and tube working elements, at their respective points of contact with the web, all must be brought to a selected speed relation with the paper. In the case of the perforator and the cross-paster subunits, it is desired for them to be brought precisely to paper speed otherwise a tearing of the webs at point of contact and a smearing of the paste will occur. However, regarding the tube separator, such as the tube cutter, the latter may be driven at a speed greater than paper speed. One of the important features of an apparatus of this type is that it be able to manufacture bag tubes of a wide variety of lengths, for example, 21 inches up to 60 inches. The paper or web speed employed within these limits of tube lengths may be about the same, that is, paper speed for the forming of a 21 inch tube may be substantially the same as the paper speed employed in the forming of a 60 inch tube. The shorter tube lengths are formed by rotating the web and tube working elements at a relatively higher number of r.p.m., such elements being rotated at a relatively lower number of r.p.m. for the manufacture of the longer tube lengths. More paper is thus drawn through the machine for each revolution of such elements in the manufacture of the longer tube lengths. However, the aforementioned selected speed ratio must be attained between the paper and such elements at the point of action, viz., the perforator and cross-paster must be brought exactly to paper speed. Consequently, the web working elements, while being rotated at the higher number of r.p.m., must be slowed down at the point of contact with the paper web in order to attain the same speed as the paper. This is illustrated in the grapth of Fig. 11 wherein it is seen by line 158 that for a 21 inch bag the cross-paster is substantially slowed down in order to attain paper speed. On the other hand, when a long tube, such as one of 60 inch length, is being manufactured, the perforator and cross-paster are rotated at a relatively low number of r.p.m. but at the point of contact must be speeded up to attain paper speed and hence, as also shown on Fig. 11 by line 136, the cross-paster (illustratively) is substantially speeded up in order to attain such paper speed at the point of contact.

These changes in speed of the web working (and tube working) elements are, of course, attainable by the use of a mechanism, such as the vari-coupler above described, which is capable of cyclically varying the speed of the particular element during each revolution.

However, the substantial cyclical variation of the speed of such elements during each revolution thereof produces forces in the form of torque surges which in turn are a function of acceleration. If such torque surges can be at least partially counterbalanced, a desirable result will occur in that wear and shock will be reduced. As aforementioned this is effected by the double arm vari-coupler illustrated in Fig. 7, and the result of the particular interconnection of such elements is graphically illustrated in Fig. 11 wherein the forces symbolized by the acceleration of one element are at least partially counterbalanced by the oppositely acting forces symbolized by the acceleration of the other element interconnected therewith.

Such partial counterbalancing is attained in the present invention by the particular interconnection of the group of perforator subunits with the group of cross-paster subunits by the vari-coupler 102 wherein the driving pins of the two vari-arms are situated 180° out of phase and each perforator subunit is connected for movement 180° out of phase with the corresponding cross-paster subunit. This phase relation is never changed once it has been set upon these several subunits.

Thus when it is desired to adjust the machine for a new bag tube length, the aforementioned phase relation of the perforator subunits as a group and the cross-paster subunits as a group is not altered but instead the relative distance between such groups is changed by a multiple of one-half of the bag tube length because of said 180° out of phase relationship. The effect of so relatively moving the two separate groups of subunits is to change the web length therebetween. This result can be achieved in other ways without such relative movement although the latter is a convenient means for doing it. Any other suitable means can be employed which will change by a common amount the web length between each perforator and cross-paster.

There are thus provided novel method and apparatus for the automatic control of the phase of operations on a plurality of webs, such operations being performed before and after the tubing of such webs. By means of the invention there can be automatically maintained a desired phase relationship (such as registration) of certain characteristics of the webs with one another and with a tube separating device. Such characteristics may include, for example, preprinted reference marks spaced at a selected interval on one or more of the webs, web perforations, thumb cuts, and the like.

The web perforators of the present invention may be adapted to form perforations as in said copending application Serial No. 378,340, or the apparatus can be adapted for the formation of corner cuts, such as those for flush cut corners of stepped-end bags.

Alluding to that aspect of the invention wherein two separate operations (such as cross-pasting and perforating) are performed upon each of a plurality of the paper webs prior to tubing, the invention enables the adjustment of the phase relationship of such elements for all plies simultaneously, a result not heretofore attained.

What is claimed is:

1. In a bag tube manufacturing apparatus, means for drawing therethrough a plurality of webs from a plurality of rolls, means for forming same into a flattened tube, a web working device for acting on at least one of said webs before being formed into a tube, a second device for acting on such formed tube, one of said webs having indicia thereon separated by a selected interval, means for determining the position of each indicium with respect to a norm position at the time of a selected position in each cycle of operation of such web working device, means for adjusting the speed of operation of such web working device in response to the departure of said web working device and said indicia from a selected norm phase relation, said web working device forming a series of characteristics upon at least one of said webs, means for determining the position of each such characteristic with respect to a second norm position located in advance of said tube former at the time of a selected position in each cycle of such second device, and means for adjusting the speed of such second device in response to a selected departure of such characteristics and said second device from a preselected norm phase relation.

2. In a bag tube manufacturing apparatus, means for drawing a plurality of flat paper webs from a like plurality of rolls of paper, means for forming such webs into a flattened tube, a web working device for acting cyclically on at least one of said webs before being formed into a tube, a second device for acting cyclically on the formed tube, one of said webs having a series of preprinted impressions thereon separated by a selected interval, means for determining the position of each of such impressions with respect to a norm position at the time of a selected position in each cycle of such web working device, means for adjusting the speed of operation of such web working device in response to the departure of said web working device and said impressions from a selected norm phase relation, said web working device forming a series of characteristics upon at least one of said webs, means for determining the position of each such characteristic with respect to a second norm position located in advance of said tube former at the time of a selected position in each cycle of such second device, and means for adjusting the speed of such second device in response to a selected departure of such characteristics and said second device from a preselected norm phase relation.

3. In apparatus for manufacturing bag tubes, means for drawing a plurality of paper webs from a plurality of paper rolls, a tube former through which such paper web drawing means draws the paper webs thereby folding same into a continuous tube, primary means situated in advance of said tube former and including a cyclically operable web working device for acting upon at least one of such webs prior to tubing, such web working device acting upon the web at bag length intervals, cyclically operable secondary means for acting at bag length intervals upon the tube, said means for drawing the plurality of webs through the machine including draw rolls situated intermediate said secondary means and said tube former, drive means for said draw rolls for driving same at a constant selected speed, at least one of said webs having a series of impressions preprinted thereupon separated by a selected interval, means for comparing the phase of said primary means and the phase of said impressions, said drive means for the aforementioned draw rolls also being operatively connected to said primary and secondary means for driving same, means for effecting a speed adjustment of said primary means responsive to the phases of said impressions and said primary means departing by a preselected degree from a selected norm phase relationship, said primary means creating a series of characteristics upon at least one of said webs, means for comparing the phase of said characteristics at a location situated in advance of said tube former with the phase of said secondary means, means for effecting a speed adjustment of said secondary means responsive to the occurrence of a selected phase departure of said characteristics and secondary means.

4. In a bag tube manufacturing apparatus, means for drawing a plurality of paper webs from a like plurality of rolls; a tube former for forming such webs into a flattened tube; primary means for acting on at least one of said webs prior to being formed into a tube; secondary means for acting on said formed tube; at least one of said webs having a series of primary characteristics thereupon occurring at a substantially constant interval; said drawing means including draw rolls situated between said tube former and said secondary means; power means for driving said primary means, draw rolls and secondary means; an operative interconnection between said power means and said draw rolls whereby the latter is driven at a fixed speed ratio with respect to the speed of said power means; an operative interconnection between said power means and said primary means including: a main differential and a speed correction motor operatively connected to said main differential for adjusting the speed of operation of said primary means; means for comparing the phase of said primary characteristics with the phase of said primary means; means for actuating said correction motor in response to such phases departing from a selected norm relation; said primary means forming a series of secondary characteristics upon at least one of said webs; means for scanning such secondary characteristics at a location in advance of such tube former; means for comparing the phase of such secondary characteristics with the phase of said secondary means; an operative interconnection between said power means and said secondary means including: a second main differential and a second speed correction motor operatively connected to said second main differential for adjusting the speed of operation of said secondary means; and means for controlling said second speed correction motor in response to the phase of said secondary characteristic departing from a selected norm relation with the phase of said secondary means.

5. In a speed compensator system for a multi-ply paper bag tube forming machine, such machine having a tube former comprising a device for forming into a tube the multiple plies of paper and also having a web assembly unit for assembling such webs at a selected station prior to forming same into a tube, and also having a plurality of web working elements for acting upon one or more of the webs prior to the tubing of the latter, and also having a tube separating device situated for acting upon the tube and separating same into bag tube lengths, one of said webs having a series of reference marks thereon spaced at a constant interval, the combination therewith including: means for scanning at a norm position such web bearing such reference marks, said norm position being in advance of said tube former, such scanning means being adapted for producing a first series of signals responsive to such reference marks, means for producing a second series of signals responsive to the cyclic operation of one of said web working elements; means for comparing the phases of said two series of signals, means for controlling the driving power directed to such web working elements in response to such phases departing from a selected norm relation, second scanning means for scanning a series of characteristics of one of said webs made therein by one of said web working elements, such last-mentioned scanning means being located at a second norm position situated in advance of said assembly station and being adapted for producing a third series of signals responsive to such series of characteristics, means for producing a fourth series of signals responsive to the cyclic operation of such tube separating device, means for comparing the phases of said third and fourth series of signals, and means for modifying the speed of said tube separating device in response to said third and fourth series of signals departing from a selected norm phase relation.

6. In a multi-ply paper bag tuber machine, a tube former comprising a device for folding multiple webs into a tube; a web assembly unit situated in advance of such tube former and having a web assembly station at which all of the webs are assembled in superposed relation prior to being directed to said tube former; a first group of web working elements situated in advance of said web assembly unit, said web working elements acting upon a plurality of such webs each to produce a characteristic upon its respective web; a second group of web working elements, also situated in advance of said web assembly unit, such second group of elements also acting upon a plurality of said webs each to produce a characteristic upon its respective web; the web working elements of said first group being so located relative to said web assembly unit that, as measured longitudinally along each web, there is a common distance between the web contact station of each such element and said web assembly station; such groups of web working elements being mounted for relative movement as groups whereby such common distance can be adjusted for a different bag tube length by a single relative movement of such groups; draw roll means for said bag tuber machine; a bag tube separator for acting upon such tube for separating same into bag tube lengths; one of said webs having a series of reference marks thereon; means responsive to the phase of such reference marks at a location situated in advance of said web assembly station; means responsive to the phase of one of said web working elements; common power means for driving said web working elements, draw roll means, and tube separator; means for modifying the driving power to said two groups of web working elements in response to said two phases departing from a selected norm relation; means responsive to the phase of a series of characteristics made upon one of said webs by one of said web working elements, such phase being sensed at a location in advance of said web assembly station; means responsive to the phase of said tube separator; means for comparing said last two mentioned phases; means for modifying the driving power to said tube separator in response to such last two mentioned phases departing from a selected norm relation; a variable speed control device operatively connected to said web working elements, draw roll means and tube separator for introducing a common speed correction thereto; and means for actuating such variable speed control device during a preselected time interval in response to the occurrence of a preselected number of phase departures in a common direction of one of the aforementioned pairs of compared phases.

7. In a multi-ply paper bag tuber machine, a tube former comprising a device for folding multiple webs into a tube; a web assembly unit situated in advance of such tube former and having a web assembly station at which all of the webs are assembled in superposed relation prior to being directed to said tube former; a first group of web working elements situated in advance of said web assembly unit, said web working elements acting upon a plurality of such webs each to produce a characteristic upon its respective web; a second group of web working elements, also situated in advance of said web assembly unit, such second group also acting upon a plurality of said webs each to produce a characteristic upon its respective web; the web working elements of said first group being so located relative to said web assembly unit that, as measured longitudinally of each web, there is a common distance between the web contact station of each such element and said web assembly station; such groups of web working elements being mounted for relative movement as groups whereby such common distance can be adjusted for a different bag tube length by a single relative movement of such groups; draw roll means for said bag tuber machine; a bag tube separator for acting upon such tube for separating same into bag tube lengths; one of said webs having a series of reference marks thereon; means responsive to the phase of such reference marks; means responsive to the phase of one of such web working elements; common power means for driving said web working elements, draw roll means, and tube separator; means for modifying the driving power to said two groups of web working elements in response to said two phases departing from a selected norm relation; means responsive to the phase of a series of characteristics made upon one of said webs by one of said web working elements, such phase being sensed at a location in advance of said web assembly station; means responsive to the phase of said tube separator; means for comparing said last two mentioned phases; and means for modifying the driving power to said tube separator in response to such last two mentioned phases departing from a selected norm relation.

8. In a bag tuber machine, a first web working unit including a plurality of subunits for acting upon each of a plurality of webs, a second web working unit including a plurality of subunits also for acting upon a plurality of such webs, each of such subunits comprising a cyclically operable web working element, common coupling means for said two groups of subunits including a double arm vari-coupler device, the latter comprising a driving member rotatable about its axis of rotation, a pair of coaxial follower members rotatable about a common axis, said driving member being drivably connected to one of said driven members by a driving pin fixed upon one of such members which engages a substantially radially extending guide channel formed in the other member, said driving member being similarly drivably connected to the other driven member, said driving pins being situated substantially 180° removed from one another, mounting means for said driving member, mounting means for said driven members, means for effecting relative movement between the mounting means for said pair of driven members and the mounting means for said driving member whereby the axis of the latter member is shiftable relative to the common axis of said driven members within preselected limits, the axis of said driving member thus being movable into coincidence with the common axis of said driven members and also out of coincidence within such limits, the web working subunits of said first unit being positioned for movement 180° out of phase with the web working subunits of said second unit, and means for mounting said units for movement as units relative to one another.

9. In a bag tuber machine, a first web working unit including a plurality of subunits for acting upon each of a plurality of webs, a second web working unit including a plurality of subunits also for working upon a plurality of such webs, each of such subunits being cyclically operable, common driving means for said two groups of subunits including a double arm vari-coupler device, the latter comprising a driving element rotatable about its axis of rotation, a pair of coaxial follower elements rotatable about a common axis, said driving element being drivably connected to one of said driven elements by a driving pin fixed upon one of such elements which engages a substantially radially extending guide channel formed in the other element, said driving element being similarly drivably connected to the other driven element, said driving pins being situated substantially 180° out of phase, means for effecting relative movement between said pair of driven elements and said driving element whereby the axis of the latter element is shiftable relative to the common axis for said driven elements within preselected limits, the axis of said driving element thus being movable into coincidence with the common axis of said driven elements and also out of coincidence within such limits, the web working subunits of said first unit being positioned for movement substantially 180° out of phase with the web working subunits of said second unit, and means for effecting a common adjustment of the lengths of all of the webs between such first and second groups of subunits.

10. In apparatus for operatively interconnecting a pair of cyclically operative devices each having a region of action in its cycle at which substantial torque effort is required as compared to the remainder of the cycle, a rotatable driving element, a first rotatable driven element drivably connected to one of such devices, a second rotatable driven element, drivably connected to the other of such devices means for mounting said driven elements with the axes of rotation thereof in coincidence, means for mounting said driven elements as a group and said driving element as an individual for movement relative to one another whereby the axis of the latter is adjustably positionable relative to the axes of the group of said driven elements, and means for operatively interconnecting said driving element and first and second driven elements for movement at speeds which vary periodically relative to one another during each cycle as a function of the degree of departure of the axis of said driving element from the coincident axes of said driven elements as a group, said driven elements being connected to such driving element for such speed variation 180° out of phase with one another, said cyclically operative devices being adjusted for movement whereby their respective regions of action occur 180° out of phase.

11. A speed compensator system for a multi-ply paper bag tube forming machine having a perforator unit, a tube former having a web assembly region in advance thereof, draw rolls, and a tube cutter, said draw rolls pulling a plurality of paper webs through said tube former, each web forming a ply of the bag tube, one of said webs having a series of reference marks thereon at a substantially constant interval, the combination including: main power means for driving said perforator unit, draw rolls and tube cutter; said draw rolls being driven at a fixed speed ratio with respect to said main power means; means for scanning one of said webs at a preselected norm position in advance of said tube former, such scanning means being adapted for producing a first series of signals responsive to such reference marks, means for producing a second series of signals responsive to the speed of rotation of said perforator unit; means for comparing the phases of said two series of signals; means for modifying the driving power directed to said perforator unit in response to the phases of said series of signals departing from a selected norm relation; second scanning means for scanning through the perforations in a web at a second preselected norm position in advance of said tube former, and producing a third series of signals responsive to such series of perforations formed in said web by said perforator unit, means for producing a fourth series of signals responsive to the speed of rotation of such tube cutter; means for comparing the phases of said third and fourth series of signals; and means for modifying the driving power to said tube cutter in response to the phase relationship of said third and fourth series of signals departing from a selected norm.

12. A speed compensator system for a multi-ply paper bag tube forming machine having a perforator, a tube former, draw rolls, and tube separator, said draw rolls pulling a plurality of paper webs through said tube former, each web forming a ply of the bag tube, one of said webs having a series of reference marks spaced thereon at a constant interval, the combination including: main power means for driving said perforator, draw rolls and tube separator; said draw rolls being driven at a fixed speed ratio with respect to said main power means; means responsive to the phase of said reference marks at a location in advance of said tube former; means responsive to the phase of said perforator; means for comparing such phases; means for modifying the driving power to said perforator in response to the occurrence of a selected departure of said phases; means positioned on one side of one of such webs for directing light energy in a location in advance of such tube former and in the path of a series of perforations in such web as formed by said perforator light sensitive means located on the other side of such web for sensing light passing through the web via such perforations and hence responsive to the phase of such perforations; means responsive to the phase of said tube separator; and means for modifying the driving power directed to said separator in response to the occurrence of a selected departure of said last two mentioned phases.

13. In a machine for manufacturing multi-ply paper bag tubes, the combination including: a plurality of perforators; a web assembly unit; a tube former unit; a tube separator situated in that order; draw roll means for urging a plurality of paper webs through said machine, each web forming a ply of the bag tube, one of said webs having a series of reference indicia thereon spaced at a substantially constant interval appropriate to the interval of a series of preprinted impressions upon such web; main drive power means; operative interconnection means between said power means and said perforators, draw roll means and separator; variable speed control means drivably connected to such operative interconnection means; the latter including a pair of main differentials, the output of one being connected to said perforators as a group and the output of the other to said tube separator, each of said main differentials having a primary and a secondary input, the primary input of each such differential being drivably connected to said main drive power means; the secondary input of each of said differentials being drivably connected to said variable speed control means whereby a common adjustment of such latter speed control means will similarly affect both said perforators as a group and said tube separator, thereby providing a single adjustment to aid in bringing said perforators and tube separator at least temporarily in phase with said reference indicia; means for adjusting one of the inputs of that main differential connected to said perforators in response to the phase of said reference indicia with respect to the phase of a perforator departing from a selected norm; and means for adjusting one of the inputs of that main differential connected to said tube separator in response to the departure from a selected norm of the phase of said perforations in one of said webs with respect to the phase of said tube separator, the phase of said perforations being determined in advance of said tube former unit.

14. Apparatus in accordance with claim 13 including means for adjusting said variable speed control means in response to said first and second mentioned phases departing from a norm relation in a common direction by a selected amount.

15. In a machine for manufacturing multi-ply paper bag tubes, the combination including: a perforator group unit including a plurality of perforators, a web assembly unit, a tube former unit, a tube cutter, situated in that order, draw roll means for urging a plurality of paper webs through said machine, each web forming a ply of the bag tube, one of said webs having a series of reference indicia thereon spaced at a substantially constant interval appropriate to the interval of a series of impressions preprinted upon such web, main drive power means, means for operatively interconnecting said main drive power means to said perforators, draw roll means and tube cutter, said operative interconnecting means including a pair of main differentials, the output of one of such differentials being connected to said perforators as a group and that of the other differential to said tube cutter, each of said main differentials having a primary and a secondary input, said main drive power means being drivably connected to the primary input of both of such differentials, a pair of auxiliary differentials each having an output and a primary and a secondary input, the output of one of such auxiliary differentials being connected to the secondary input of one of such main differentials, and the output of the other auxiliary differential being connected to the secondary input of the other main differential, a pair of speed correction motors respectively drivably connected to the primary inputs of said auxiliary differentials, a variable speed control device drivably connected to the secondary inputs of both of said auxiliary differentials, means for adjusting the speed of that speed correction motor which is operatively connected to said perforators via its auxiliary and main differentials, in response to the departure of the phase of said reference indicia from a preselected norm relation to the phase of one of said perforators, the phase of said reference indicia being determined at a location in advance of said tube former unit; means for adjusting the speed of the other of said speed control motors in response to the phase of the perforations formed in said preprinted web departing from a selected phase relation from the phase of said tube cutter, the phase of said perforations being determined at a location intermediate the perforator which forms same and said web assembly unit.

16. In a speed adjusting system for a multi-ply paper bag tuber, the latter including a plurality of rotary perforators, a tube former, draw rolls, and a rotary tube cutter, said draw rolls being positioned between said tube cutter and tube former for pulling a plurality of paper webs through such tube former, each web forming a ply of the bag tube, one of said webs having a series of reference indicia marked thereon at a substantially constant interval corresponding to the interval between impressions preprinted upon such web, the combination including: a pair of main differential means respectively connected to said rotary perforators as a group and to said tube cutter; main power drive means; a single variable speed control device drivably connected to said main power drive means and deriving its input torque therefrom; means for operatively interconnecting said main power drive means to one input of each of said main differential means; means for operatively interconnecting said variable speed control device to the other of the inputs of each of said main differential means whereby each of such main differential means drives its respective group of perforators and tube cutter under the influence of such two inputs, a common speed adjustment upon said variable speed control device thus being applicable both to said perforators as a group and to said tube cutter; a reversible electric motor drivably connected to one of the inputs of the main differential for said perforators; means for actuating said reversible motor in response to the departure from a norm relation of the phase of said reference indicia with respect to the phase of at least one of said perforators; a second reversible electrical motor operatively connected to one of the inputs of such main differential for said tube cutter; and means for actuating the latter motor in response to the departure from a preselected norm relation of the phase of the perforations made by one of said perforators in a web with respect to the phase of said tube cutter, such phase relation being determined with respect to perforations passing a norm position in advance of said tube former, said main drive means driving said draw rolls at a velocity bearing a fixed ratio to the velocity of such drive means.

17. In a speed adjusting system for a multi-ply paper bag tuber, the latter including a plurality of rotary perforators, a tube former, draw rolls, and a rotary tube separator, said draw rolls being positioned between said tube cutter and tube former for pulling a plurality of paper webs through such tube former, each web forming a ply of the bag tube, one of said webs having a series of reference indicia marked thereon at a substantially constant interval corresponding to the interval between impressions preprinted upon such web, the combination including: a pair of main differentials respectively connected to said rotary perforator units as a group and to said tube cutter; main power drive means; a single variable speed control device; means for operatively interconnecting said main power drive means to one input of each of said main differentials; means for operatively interconnecting said variable speed control device to the other of the inputs of each of said main differentials whereby each of such main differentials drives its respective group of perforators and tube cutter under the influence of such two inputs, a common speed adjustment upon said variable speed control device thus being applicable both to said perforators as a group and said tube separator; a reversible electric motor drivably connected to one of the inputs of the main differential for said perforators; means for actuating said reversible motor in response to the departure from a preselected norm relation of the phase of said reference indicia with respect to the phase of one of said perforators; a second reversible electrical motor operatively connected to one of the inputs of such main differential for said tube cutter; and means for actuating the latter motor in response to the departure from a preselected norm relation of the phase of the perforations made by one of said perforators in a web with respect to the phase of said tube separator, such phase relation being determined with respect to perforations passing a norm position in advance of said tube former, the phase of such perforations being determined by means for sensing light energy passing through such perforations.

18. In a machine for manufacturing multi-ply paper bags, including in combination: a web perforator unit; a multi-ply bag tube former situated following said web perforator unit; draw roll means for pulling a plurality of paper webs through said perforator unit and tube former, each web forming a ply of the bag tube; one of such webs having a series of reference indicia thereon at a substantially constant interval; a tube separator situated following said bag tube former, said draw roll means including draw rolls situated between said separator and tube former; primary drive means; an adjustable variable speed control device, said variable speed control device being operatively connected to said perforator unit and tube separator whereby a common speed adjustment can be introduced to both through the intermediary of a pair of differential means, one connected to said perforator unit and one to said separator, said primary drive means also being drivably connected to both of said differential means; means for determining the relation of the phases of said indicia and of said perforator unit, auxiliary drive means for said perforator unit under the influence of said phase relation determining means for introducing the driving torque to such perforator unit to adjust the angular velocity of the latter unit in response to the phase of said indicia and perforator departing from a selected norm relation, means for determining the relation of the phase of the perforations in one of said webs and the phase of said separator; and a second auxiliary drive means under the influence of said second phase relation determining means and operatively connected to said tube separator for introducing a driving torque thereto to adjust the speed thereof in response to said last-mentioned phase relation departing from a selected norm.

19. In a machine for manufacturing multi-ply paper bag tubes, the combination including: a perforator unit having rotary web perforator means, a tube former, draw rolls and a rotary tube cutter element situated in that order; said draw rolls aiding in pulling a plurality of paper webs through said tube former, each web forming a ply of the bag tube, one of said webs having a series of reference indicia thereon at a substantially common interval; drive means; said draw rolls being driven by said drive means at a fixed speed ratio with respect thereto; adjustable variable speed control means for introducing a common speed adjustment torque to said perforator unit and tube cutter; a pair of differential means for superimposing the driving torque from said variable speed control means and said drive means for driving respectively said perforator unit and tube cutter; auxiliary drive means including a reversible electric motor operatively connected to said perforator unit; means for actuating said auxiliary drive means in response to a departure from a selected norm relation of the phase of said reference indicia and the phase of said rotary perforator means; auxiliary drive means for said tube cutter including a reversible electric motor; and means for actuating said reversible electric motor in response to a departure from a selected norm of the phase relation of the perforations at a location in advance of said tube former with respect to the angular movement of said rotary cutter element.

20. In a machine for manufacturing multi-ply paper bag tubes, the combination including: a perforator unit having web perforator means, a tube former, draw rolls and a tube cutter situated in that order; said draw rolls aiding in pulling a plurality of paper webs through said tube former, each web forming a ply of the bag tube, one of said webs having a series of reference indicia preprinted thereon at a common interval; drive means; said draw rolls being driven by said drive means at a fixed speed ratio with respect thereto; a variable speed control device for introducing a common speed adjustment torque to said perforator unit and tube cutter; a pair of differentials for combining the driving torque from said variable speed control means and said drive means for driving respectively said perforator unit and tube cutter; auxiliary drive means including a reversible electric motor operatively connected to said perforator unit; means for actuating said auxiliary drive means in response to a departure from a selected norm relative to the phase of said reference indicia as compared to the phase of said perforator means; auxiliary drive means for said tube cutter including a reversible electric motor; means for actuating said reversible electric motor in response to a departure from a selected norm relation of the phase of the perforations in a web at a location in advance of said tube former with respect to the phase of said cutter; and means responsive to the occurrence of a preselected departure in a common direction of such third-mentioned phase from such fourth-mentioned phase for adjusting the output of said variable speed control device.

21. In a machine for manufacturing multi-ply paper bag tube blanks, a multi-ply paper bag tube former having draw roll means for pulling a plurality of paper webs therethrough, each web forming a ply of the bag tube, one web having a series of reference indicia thereon at a substantially common interval; a plurality of web elements for acting on the webs, such elements being situated ahead of said tube former; a tube separator situated following said tube former and substantially spaced from said web elements; a main drive power unit; an adjustable variable speed control device drivably connected to said power unit; a first differential means drivably connected to and deriving its two input torques from said main drive power unit and said variable speed control device respectively, the single output of said first differential means being drivably connected to said web elements as a group; a second differential means drivably connected to and deriving its two input torques from both said main drive power unit and said variable speed control device respectively, the single output of said second differential means being drivably connected to said tube separator; change gear means, substantially appropriate to said interval, interposed between said main drive power unit and said draw roll means, said draw roll means including draw rolls situated between said tube former and separator, said draw rolls being driven at a constant speed ratio with respect to said main drive power unit; photoelectric means operatively connected to at least one of said web elements for producing a series of signals responsive to said series of indicia, means for comparing the phase thereof to the phase of movement of one of said web elements; power means under the influence of said comparing means, such power means being drivably connected to said web elements as a group for introducing a speed correction thereto in response to the departure from a selected norm relation of the phases of said indicia and web element; a second photoelectric means for scanning at a location between said web element and tube former the series of web characteristics formed in one of said webs by one of said web elements; means for comparing the phase thereof to the phase of movement of said separator cutter; a second power means under the influence of said second comparing means and drivably connected to said tube separator for introducing a speed correction thereto in response to the departure from a selected norm of said last two mentioned phases; and means for actuating said variable speed control device in response to one of said phases as determined from said web being out of normal phase relation in a common direction relative to one of such other phases driving a selected number of cycles.

22. A speed compensator system for a multi-ply bag tube forming machine, which speed compensator system is adapted for insuring proper phase relationship between operations performed on one or more of the webs prior to forming the tube with operations performed on the tube, one of said webs bearing preprinted impressions thereupon spaced at a selected interval, such preprinted web bearing a series of indicia thereon spaced at an interval appropriate to the first mentioned interval, such tube forming machine including in combination: a first group of elements, each of which is movable about its axis for operating upon its respective web; web guide means for guiding said webs to a web assembly region where they are directed together in consecutive face-to-face engagement, said guide means being so situated with respect to said first group of elements and said web assembly region that there is a substantially common distance between the point of operation of each of said elements on its respective web and such web assembly region; a tube former for forming said webs into a tube; draw rolls for drawing said webs through said former, a second element for operating periodically upon said tube in selected phase relationship to those locations on the tube operated upon by such first group of elements; means for producing a signal responsive to and characteristic of the position of each of selected of such indicia with respect to a norm station at a selected time in the cyclic advance of one of said group of elements; means for adjusting the speed of such first group of elements in response to such signal; means for producing a second signal responsive to and characteristic of the position of characteristics in one of said webs formed by one of said first group of elements and with respect to a second norm station at a selected time in the cyclic advance of said second element; and means for modifying the driving power directed to said second element in response to such second signal, said second norm position being situated between said first group of elements and said web assembly region.

23. In a tubing machine, means for drawing a plurality of paper webs from a plurality of paper rolls; a tube former for forming such webs into a flattened tube; said drawing means including draw rolls situated to act upon the tube so formed; a bag tube separating device for separating the tube into bag tube lengths; at least one of said plurality of webs having a series of impressions preprinted thereupon separated by a selected interval which is a function of the selected bag length; primary means for acting upon such webs before being tubed including one or more web working elements; web assembly means having a web assembly station, said assembly means being adapted for guiding and assembling the plurality of paper webs prior to directing same into the aforementioned tube former; said web working elements being so situated relative to said web assembly means whereby there is substantially a common distance between: the point of action of each of such elements on its respective web, and such web assembly station; secondary means including the aforementioned tube separating device for acting on the tube; the aforementioned web bearing the series of preprinted impressions also bearing a series of indicia, each indicium being at a selected location relative to its respective preprinted impression; a web indicia scanner situated in advance of said web assembly means for scanning such indicia bearing web at a norm position in advance of such web assembly station; such scanner being responsive to the passage of said indicia and hence to the position of said impressions; means operatively connected to said scanner, responsive to the movement of at least one of said web working elements, and adapted for producing a speed correction signal responsive to and characteristic of the position of each indicium with respect to said norm position during a selected portion of the cycle of operation of a web working element; a second web scanner situated at a second norm position located between such primary means and said web assembly station, such primary means forming a scannable characteristic in a selected web; means operatively connected to said second scanner and responsive to the movement of said secondary means, and adapted for producing another speed correction signal responsive to and characteristic of the position of each such scannable characteristic with respect to said second norm position during a selected portion of the cycle of such secondary means; means for adjusting the speed of said primary means responsive to such first-mentioned signals; means for adjusting the speed of said secondary means responsive to such other signal; drive means for both said primary and secondary means; and means operatively connected to one of said scanners, and responsive to receipt therefrom of a selected number of speed correction signals in a common direction for actuating a common speed correction means to which is connected both said primary and secondary means.

24. In a bag tuber, means for drawing a plurality of paper webs from a plurality of paper rolls; a web folder for folding such webs into a flattened tube; said drawing means including draw rolls situated to act upon the tube which has been folded by such folder; a bag tube separating device for separating the tube into bag tube lengths; at least one of said plurality of webs having indicia thereon in series separated by a selected interval; primary means for acting upon such webs before being tubed including one or more web working elements; web assembly means having a web assembly station, said web assembly means being adapted for guiding and assembling the plurality of paper webs prior to directing same into the aforementioned tube folder; said web working elements being so situated relative to said web assembly means whereby there is within selected error limits a substantially common distance between the point of action of each of such working elements on its respective web, and such web assembly station; secondary means including the aforementioned tube separating device for acting on the tube; a web indicia scanner situated at a norm position in advance of said web assembly means for scanning such indicia bearing web in advance of such web assembly station; means operatively connected to such scanner and such primary means for producing a speed correction signal responsive to and characteristic of the position of each indicium with respect to such norm position at a selected point in the cycle of operation of a web working element; a second web scanner including a source of light energy situated on one side of a selected web and a light sensitive element on the other side for scanning a second norm position located between such primary means and said web assembly station, such primary means forming a scannable characteristic including a web weakening line in such selected web through which light can pass; means for producing another speed correction signal responsive to and characteristic of the position of each such scannable characteristic with respect to said second norm position at a selected point in the cycle of operation of such secondary means; means for adjusting the speed of said primary means responsive to such first-mentioned speed correction signals; means for adjusting the speed of said secondary means responsive to such other speed correction signals; and means operatively connected to one of said scanners, and responsive to receipt therefrom of a selected number of speed correction signals in a common direction for introducing a common speed correction to both said primary and secondary means.

25. In a bag tuber machine, a first web working unit including a plurality of subunits for acting upon each of a plurality of webs; a second web working unit including a plurality of subunits also for working upon a plurality of such webs, each of such subunits comprising a cyclically operable web working element; common coupling means for said two groups of subunits including a double arm vari-coupler device, the latter comprising a rotatable driving element, a first rotatable driven element, a second rotatable driven element, means for mounting said driven elements with the axes of rotation thereof in a selected relation to one another, means for mounting said driven elements as a group and said driving element as an individual for adjusting movement relative to one another whereby the axis of the latter is adjustably movable relative to the axis of the group of said driven elements, a pin and guide channel interconnection between said driving element and said first driven element, and a pin and guide channel interconnection between said driving element and said second driven element, each such interconnection comprising a pin member fixed to one of the two elements, which pin member engages a substantially radially extending guide channel member in the other element, such members on such driving element being positioned for operation out of phase with one another by a selected angular amount; one of said driven elements being operatively connected to one group of said subunits, the other driven element being operatively connected to the other group of subunits, the aforementioned web working subunits of said first unit being positioned for movement out of phase with the web working subunits of said second unit by an amount which is a function of the phase separation of said members on said driving element; and means for effecting a common adjustment of the lengths of all of the webs between such first and second groups of subunits.

26. In a bag tuber machine, a first web working unit; a second web working unit; at least one of such units including a plurality of subunits for acting on each of a plurality of webs, the other web working unit including at least one subunit for acting upon at least one of such webs, each of such subunits comprising a cyclically operable web working element; power means for driving said web working units; means for operatively interconnecting said driving means and said web working units, there being interposed in said operative interconnection for each of said units vari-coupler means, the latter comprising: a driving element rotatable about its axis of rotation, a rotatable driven element, means for mounting said driven element and said driving element for movement relative to one another whereby the axis of one is adjustably positionable relative to the axis of the other, a pin and guide channel interconnection between said driving and driven elements, each such interconnection comprising a pin member fixed to one of the two elements, which pin member engages a substantially radially extending guide channel member in the other element; and means for effecting a common adjustment of the lengths of all of the webs between said first and second web working units.

27. In apparatus for operatively interconnecting a pair of cyclically operable devices each having a region of action in its cycle at which a substantial torque effort is required as compared to the remainder of the cycle, such torque efforts each producing a substantial reaction torque surge, said apparatus minimizing the effect of such reaction torque surges and including in combination: a rotatable input driving element, a first rotatable output driven element drivably connected to one of such devices, a second rotatable output driven element drivably connected to the other of such devices, said pair of devices being so drivably connected to such driven elements for operation 180° out of phase with one another, means for mounting said driven elements with the axes of rotation thereof in coincidence, means for mounting said driven elements as a group and said driving element as an individual for movement adjustably relative to one another whereby the axis of the latter is adjustably positionable relative to the axis of the group of said driven elements, such group and individual axes thus being movable into coincidence or into spaced substantially parallel relation, a variable arm crank interconnection between said driving element and said first driven element, and a second variable arm crank interconnection between said driving element and said second driven element, said crank interconnections being 180° out of phase with one another, each of the aforementioned regions of action of substantial torque effort occurring as a result of separation of said group and individual axes, the effect of such reaction torque surges being substantially eliminated responsive to said axes being in coincidence, and in response to said mounting means being adjusted to position said group and individual axes in spaced parallel relation said devices being movable at velocities which vary periodically and 180° out of phase whereby the reaction torque of one device is at least partially offset by a reaction torque of the other device.

28. In apparatus for operatively interconnecting a pair of cyclically operable devices each of which has as a result of adjustment of such apparatus a region of action in its cycle at which a substantial torque effort is required periodically in the cycle, such apparatus including in combination: a rotatable input driving element, a first rotatable output driven element drivably connected to one of such devices, a second rotatable output driven element drivably connected to the other of such devices, said two driven elements being so connected, respectively, to said devices that the periodic torque requirements of one of such devices occurs 180° out of phase with such torque requirements of the other device, means for coaxially mounting said driven elements, means for mounting said driven elements as a group and said driving element as an individual for movement relative to one another whereby the axis of the latter is adjustably positionable relative to such common group axis of said driven elements, such group and individual axes being adjust-ably positionable in or out of coincidence, an operative interconnection between said driving element and said first driven element, and an operative interconnection between said driving element and said second driven element, each such interconnection comprising variable arm crank means, the latter means being 180° out of phase with one another, said periodic torque requirements occuring in response to the separation of said group and individual axes and the reaction torques thereof partially counterbalancing one another because of such 180° phase separation.

29. In a bag tube manufacturing apparatus, means for drawing therethrough a plurality of webs from a plurality of rolls, a tube former, a web working device having a region of action wherein it acts on at least one of said webs, a second web working device having a region of action wherein it acts on at least one of said webs, said web working devices being situated in advance of the tube former and being constructed and arranged for acting on such webs in a cyclical manner, a rotatable driving element, a first rotatable driven element drivably connected to one of such web working devices, a second rotatable driven element drivably connected to the other of such web working devices, means for mounting said driven elements with the axes of rotation thereof in coincidence, means for mounting said driven elements as a group and said driving element as an individual for movement relative to one another whereby the axis of the latter is adjustably positionable relative to the axes of the group of said driven elements, and means for operatively interconnecting said driving element and said first and second driven elements for movement at speeds which vary periodically relative to one another during each cycle as a function of the degree of departure of the axis of said driving element from the coincident axes of said driven elements as a group, said driven elements being connected to such driving element for such speed variation 180° out of phase with one another, said cyclically operative web working devices being adjusted for movement whereby their respective regions of action occur 180° out of phase.

30. In apparatus for operatively interconnecting a plurality of cyclically operative devices each having a region of action in its cycle at which substantial torque effort is required as compared to the remainder of the cycle, a rotatable driving element, a plurality of driven elements each drivably connected to one of such devices, means for mounting said driven elements with the axes of rotation thereof in coincidence, means for mounting said driven elements as a group and said driving element as an individual for movement relative to one another whereby the axis of the latter is adjustably positionable relative to the axis of the group of said driven elements, and means for operatively interconnecting said driving element and each of said driven elements for movement at speeds which vary periodically relative to one another during each cycle as a function of the degree of departure of the axis of said driving element from the coincident axes of said driven elements as a group, said driven elements being connected to such driving element for such speed variation a predetermined number of degrees out of phase with one another, said cyclically operative devices being adjusted for movement whereby their respective regions of action occur the same predetermined number of degrees out of phase.

References Cited in the file of this patent

UNITED STATES PATENTS

| | | |
|---|---|---|
| 1,975,121 | Potdevin | Oct. 2, 1934 |
| 2,078,496 | Jaite | Apr. 27, 1937 |
| 2,091,771 | Smithwick | Aug. 31, 1937 |
| 2,099,314 | Potdevin | Nov. 16, 1937 |
| 2,302,064 | Sieg | Nov. 17, 1942 |
| 2,581,801 | Lienart | Jan. 8, 1952 |